(12) United States Patent
Griess et al.

(10) Patent No.: US 10,112,373 B2
(45) Date of Patent: Oct. 30, 2018

(54) MULTI-LAYER METALLIC STRUCTURE AND COMPOSITE-TO-METAL JOINT METHODS

(71) Applicant: The Boeing Company, Chicago, IL (US)

(72) Inventors: Kenneth Harlan Griess, Kent, WA (US); Gary E. Georgeson, Tacoma, WA (US)

(73) Assignee: The Boeing Company, Chicago, IL (US)

(*) Notice: Subject to any disclaimer, the term of this patent is extended or adjusted under 35 U.S.C. 154(b) by 537 days.

(21) Appl. No.: 14/604,719

(22) Filed: Jan. 24, 2015

(65) Prior Publication Data

US 2015/0129113 A1 May 14, 2015

Related U.S. Application Data

(60) Division of application No. 13/443,687, filed on Apr. 10, 2012, now Pat. No. 8,993,084, which is a
(Continued)

(51) Int. Cl.
*B29C 65/00* (2006.01)
*B32B 37/00* (2006.01)
(Continued)

(52) U.S. Cl.
CPC ............ *B32B 37/144* (2013.01); *B29C 70/86* (2013.01); *B29C 70/885* (2013.01); *B32B 3/06* (2013.01);
(Continued)

(58) Field of Classification Search
CPC ... B29C 65/48; B29C 65/483; B29C 65/4835; B29C 65/56; B29C 65/562; B29C 65/60; B29C 65/601; B29C 65/72; B29C 66/71; B29C 66/712; B29C 66/721; B29C 66/7212; B29C 66/723; B29C 66/7232; B29C 66/72321; B29C 66/14;
(Continued)

(56) References Cited

U.S. PATENT DOCUMENTS 3,711,934 A 1/1973 Zorowski et al.
4,072,516 A 2/1978 Pepper et al.
(Continued)

FOREIGN PATENT DOCUMENTS

EP 1050396 11/2000
EP 1296103 3/2003
(Continued)

OTHER PUBLICATIONS

""Galvanic Series,"" Rowan Technology Group, copyright 2014, 2 pages.Accessed Mar. 18, 2014, http://www.rowantechnology.com/technical-resources/galvanic-series/.
(Continued)

*Primary Examiner* — Alex B Efta
*Assistant Examiner* — Brian R Slawski
(74) *Attorney, Agent, or Firm* — Yee & Associates, P.C.

(57) ABSTRACT

A composite structure comprises stacked sets of laminated fiber reinforced resin plies and metal sheets. Edges of the resin plies and metal sheets are interleaved to form a composite-to-metal joint connecting the resin plies with the metal sheets.

17 Claims, 19 Drawing Sheets

US 10,112,373 B2
Page 2

Related U.S. Application Data continuation-in-part of application No. 12/857,835, filed on Aug. 17, 2010, now Pat. No. 8,652,606.

(51) Int. Cl.

| | | |
|---|---|---|
| *B32B 3/00* | (2006.01) | |
| *B32B 7/08* | (2006.01) | |
| *C08J 5/00* | (2006.01) | |
| *C08J 5/02* | (2006.01) | |
| *B32B 37/14* | (2006.01) | |
| *B32B 5/26* | (2006.01) | |
| *B32B 5/28* | (2006.01) | |
| *B32B 7/12* | (2006.01) | |
| *B32B 15/01* | (2006.01) | |
| *B32B 15/14* | (2006.01) | |
| *B32B 3/06* | (2006.01) | |
| *B32B 3/14* | (2006.01) | |
| *B32B 3/18* | (2006.01) | |
| *B64C 1/06* | (2006.01) | |
| *B64C 1/12* | (2006.01) | |
| *C22C 14/00* | (2006.01) | |
| *B29C 70/86* | (2006.01) | |
| *B29C 70/88* | (2006.01) | |
| *B32B 15/08* | (2006.01) | |
| *B32B 37/12* | (2006.01) | |
| *B32B 37/18* | (2006.01) | |
| *B29C 65/56* | (2006.01) | |
| *B29C 65/48* | (2006.01) | |
| *B29C 65/72* | (2006.01) | |
| *B29L 31/30* | (2006.01) | |

(52) U.S. Cl.
CPC ............ *B32B 3/14* (2013.01); *B32B 3/18* (2013.01); *B32B 5/26* (2013.01); *B32B 5/28* (2013.01); *B32B 7/12* (2013.01); *B32B 15/01* (2013.01); *B32B 15/08* (2013.01); *B32B 15/14* (2013.01); *B32B 37/12* (2013.01); *B32B 37/182* (2013.01); *B64C 1/061* (2013.01); *B64C 1/12* (2013.01); *C22C 14/00* (2013.01); *B29C 65/48* (2013.01); *B29C 65/562* (2013.01); *B29C 65/72* (2013.01); *B29C 66/14* (2013.01); *B29C 66/712* (2013.01); *B29C 66/721* (2013.01); *B29C 66/72321* (2013.01); *B29L 2031/3082* (2013.01); *B29L 2031/3088* (2013.01); *B32B 2250/05* (2013.01); *B32B 2250/20* (2013.01); *B32B 2260/023* (2013.01); *B32B 2260/046* (2013.01); *B32B 2262/106* (2013.01); *B32B 2305/076* (2013.01); *B32B 2305/77* (2013.01); *B32B 2307/714* (2013.01); *B32B 2605/18* (2013.01); *Y02T 50/43* (2013.01); *Y10T 156/10* (2015.01); *Y10T 403/70* (2015.01); *Y10T 428/12007* (2015.01); *Y10T 428/12347* (2015.01); *Y10T 428/12361* (2015.01); *Y10T 428/12493* (2015.01); *Y10T 428/19* (2015.01); *Y10T 428/195* (2015.01); *Y10T 428/31678* (2015.04)

(58) Field of Classification Search
CPC ........ B29C 66/12822; B29C 66/12842; B29C 66/1248; B32B 15/08; B32B 15/043; B32B 15/14; B32B 2605/18; B32B 3/14; B32B 3/18; B32B 37/02; B32B 37/12; B32B 37/1207; B32B 37/14; B32B 37/144; B32B 37/182; B32B 37/185
USPC ............ 156/60, 91, 92, 250, 252, 253, 288, 156/304.1, 304.3, 304.5, 307.1, 307.3, 156/307.7; 428/57, 58, 61
See application file for complete search history.

(56) References Cited

U.S. PATENT DOCUMENTS

| | | | |
|---|---|---|---|
| 4,110,501 A | 8/1978 | Tarbell et al. | |
| 4,229,473 A | 10/1980 | Elber | |
| 4,334,124 A | 6/1982 | Imsand et al. | |
| 4,498,139 A | 2/1985 | Malinovsky | |
| 4,666,546 A | 5/1987 | Treber | |
| 4,849,913 A | 7/1989 | Ward et al. | |
| 4,907,164 A | 3/1990 | Guyder | |
| 5,006,990 A | 4/1991 | Ward et al. | |
| 5,031,457 A | 7/1991 | Kline | |
| 5,038,291 A | 8/1991 | Wang et al. | |
| 5,119,309 A | 6/1992 | Cavendish et al. | |
| 5,216,612 A | 6/1993 | Cornett et al. | |
| 5,429,326 A | 7/1995 | Garesche et al. | |
| 5,429,879 A * | 7/1995 | Syn ........................ | B32B 15/01 228/190 |
| 5,452,407 A | 9/1995 | Crook | |
| 5,500,272 A | 3/1996 | Padden | |
| 5,866,272 A * | 2/1999 | Westre ...................... | B32B 3/12 428/593 |
| 5,951,800 A | 9/1999 | Pettit | |
| 5,984,511 A | 11/1999 | Vasey-Glandon et al. | |
| 6,030,483 A | 2/2000 | Wilson | |
| 6,041,132 A | 3/2000 | Isaacs et al. | |
| 6,052,631 A | 4/2000 | Busch et al. | |
| 6,138,056 A | 10/2000 | Hardesty et al. | |
| 6,253,218 B1 | 6/2001 | Aoki et al. | |
| 6,278,457 B1 | 8/2001 | Bernardini et al. | |
| 6,341,261 B1 | 1/2002 | Vasey-Glandon et al. | |
| 6,356,437 B1 | 3/2002 | Mitchell et al. | |
| 6,407,738 B1 | 6/2002 | Wakabayashi | |
| 6,445,390 B1 | 9/2002 | Aftosmis et al. | |
| 6,502,489 B2 | 1/2003 | Gerent et al. | |
| 6,625,618 B1 | 9/2003 | Arai | |
| 6,629,302 B2 | 9/2003 | Miura et al. | |
| 6,690,159 B2 | 2/2004 | Burreson et al. | |
| 6,736,919 B1 | 5/2004 | Roebroeks | |
| 6,799,081 B1 | 9/2004 | Hale et al. | |
| 6,819,966 B1 | 11/2004 | Haeberli | |
| 6,843,565 B2 | 1/2005 | Evans et al. | |
| 6,879,872 B2 | 4/2005 | Fukumura | |
| 6,959,235 B1 | 10/2005 | Abdel-Malek et al. | |
| 7,006,087 B2 | 2/2006 | Takagi | |
| 7,010,472 B1 | 3/2006 | Vasey-Glandon et al. | |
| 7,058,472 B2 | 6/2006 | Mathews et al. | |
| 7,076,323 B2 | 7/2006 | Vanderwiel | |
| 7,079,996 B2 | 7/2006 | Stewart et al. | |
| 7,099,725 B2 | 8/2006 | Murrish et al. | |
| 7,115,323 B2 | 10/2006 | Westre et al. | |
| 7,159,112 B1 | 1/2007 | Williams | |
| 7,171,344 B2 | 1/2007 | Lind | |
| 7,243,055 B2 | 7/2007 | Chen et al. | |
| 7,244,230 B2 | 7/2007 | Duggirala et al. | |
| 7,300,693 B2 | 11/2007 | Albers et al. | |
| 7,324,103 B2 | 1/2008 | Stewart et al. | |
| 7,365,747 B2 | 4/2008 | Finlayson et al. | |
| 7,366,643 B2 | 4/2008 | Verdura et al. | |
| 7,376,480 B2 | 5/2008 | Hagen et al. | |
| 7,407,556 B2 | 8/2008 | Oldani et al. | |
| 7,423,523 B2 | 9/2008 | Green | |
| 7,424,543 B2 | 9/2008 | Rice, III | |
| 7,491,289 B2 | 2/2009 | Westre et al. | |
| 7,513,965 B2 | 4/2009 | Oldani et al. | |
| 7,526,418 B2 | 4/2009 | Pita et al. | |
| 7,545,274 B2 | 6/2009 | Coop | |
| 7,555,404 B2 | 6/2009 | Brennan et al. | |
| 7,561,996 B2 | 7/2009 | Lu et al. | |
| 7,617,029 B2 | 11/2009 | Loda | |
| 7,651,756 B2 | 1/2010 | Albers et al. | |
| 7,720,561 B2 | 5/2010 | Tang et al. | |
| 7,747,421 B2 | 6/2010 | Tang et al. | |
| 7,751,917 B2 | 7/2010 | Rees et al. | |
| 7,761,183 B2 | 7/2010 | Sullivan | |
| 7,761,713 B2 | 7/2010 | Baar | |
| 7,769,481 B2 | 8/2010 | Tang et al. | |
| 7,809,454 B2 | 10/2010 | Hu et al. | |

(56) References Cited

U.S. PATENT DOCUMENTS

| | | |
|---|---|---|
| 7,809,531 B2 | 10/2010 | Murrish |
| 7,809,679 B2 | 10/2010 | Nixon et al. |
| 7,810,025 B2 | 10/2010 | Blair et al. |
| 7,823,062 B2 | 10/2010 | Liberty et al. |
| 7,869,982 B2 | 1/2011 | Drumheller et al. |
| 7,875,333 B2 | 1/2011 | Stephan |
| 7,912,602 B2 | 3/2011 | Sells et al. |
| 7,983,809 B2 | 7/2011 | Kell et al. |
| 7,987,882 B2 | 8/2011 | Kobayashi |
| 8,103,101 B2 | 1/2012 | Fujiwara et al. |
| 8,108,058 B2 | 1/2012 | Murrish et al. |
| 8,165,703 B2 | 4/2012 | Burgos Gallego et al. |
| 8,209,838 B2 | 7/2012 | Lindgren |
| 8,285,407 B2 | 10/2012 | Kessel et al. |
| 8,315,837 B2 | 11/2012 | Menayo et al. |
| 8,321,180 B2 | 11/2012 | Kessel et al. |
| 8,442,804 B2 | 5/2013 | Kessel et al. |
| 8,620,627 B2 | 12/2013 | Nakhle et al. |
| 8,652,606 B2 | 2/2014 | Griess et al. |
| 8,894,801 B2 | 11/2014 | Griess et al. |
| 8,993,084 B2 | 3/2015 | Griess et al. |
| 9,522,512 B2 | 12/2016 | Georgeson et al. |
| 2001/0045148 A1 | 11/2001 | Gerent et al. |
| 2001/0047508 A1 | 11/2001 | Miura et al. |
| 2002/0077752 A1 | 6/2002 | Burreson et al. |
| 2002/0077968 A1 | 6/2002 | Kaniwa et al. |
| 2002/0174010 A1 | 11/2002 | Rice, III |
| 2002/0183986 A1 | 12/2002 | Stewart et al. |
| 2003/0055812 A1 | 3/2003 | Williams et al. |
| 2003/0080251 A1 | 5/2003 | Anast |
| 2003/0080957 A1 | 5/2003 | Stewart et al. |
| 2003/0120472 A1 | 6/2003 | Lind |
| 2003/0145017 A1 | 7/2003 | Patton et al. |
| 2003/0191554 A1 | 10/2003 | Russell et al. |
| 2004/0021828 A1 | 2/2004 | Evans et al. |
| 2004/0024661 A1 | 2/2004 | Freel et al. |
| 2004/0134162 A1 | 7/2004 | Douglas |
| 2004/0139330 A1 | 7/2004 | Baar |
| 2004/0147840 A1 | 7/2004 | Duggirala et al. |
| 2004/0177060 A1 | 9/2004 | Nixon et al. |
| 2004/0236561 A1 | 11/2004 | Smith et al. |
| 2005/0051255 A1 | 3/2005 | Nordman |
| 2005/0055181 A1 | 3/2005 | Verdura et al. |
| 2005/0119774 A1 | 6/2005 | Murrish et al. |
| 2005/0240291 A1 | 10/2005 | Oldani et al. |
| 2005/0241261 A1 | 11/2005 | Martinez-Cepeda |
| 2005/0247396 A1 | 11/2005 | Oldani et al. |
| 2006/0015777 A1 | 1/2006 | Loda |
| 2006/0041840 A1 | 2/2006 | Blair et al. |
| 2006/0119601 A1 | 6/2006 | Finlayson et al. |
| 2006/0265198 A1 | 11/2006 | Kanai et al. |
| 2006/0291724 A1 | 12/2006 | Fujiwara et al. |
| 2007/0073429 A1 | 3/2007 | Rees et al. |
| 2007/0106418 A1 | 5/2007 | Hagen et al. |
| 2007/0150087 A1 | 6/2007 | Tang et al. |
| 2007/0154680 A1* | 7/2007 | Escobar Benavides ............... B29C 66/1122 428/99 |
| 2007/0191982 A1 | 8/2007 | Sullivan |
| 2007/0236354 A1 | 10/2007 | Green |
| 2007/0241908 A1 | 10/2007 | Coop |
| 2007/0244590 A1 | 10/2007 | Menayo et al. |
| 2008/0292849 A1 | 11/2008 | Stephan |
| 2008/0312764 A1 | 12/2008 | Murrish |
| 2009/0005928 A1 | 1/2009 | Sells et al. |
| 2009/0043533 A1 | 2/2009 | Brennan et al. |
| 2009/0076638 A1 | 3/2009 | Hu et al. |
| 2009/0112540 A1 | 4/2009 | Kessel et al. |
| 2009/0112820 A1 | 4/2009 | Kessel et al. |
| 2009/0112973 A1 | 4/2009 | Kessel et al. |
| 2009/0138139 A1 | 5/2009 | Tsai et al. |
| 2010/0042283 A1 | 2/2010 | Kell et al. |
| 2010/0161095 A1 | 6/2010 | Lindgren |
| 2011/0082681 A1 | 4/2011 | Teramae et al. |
| 2011/0087463 A1 | 4/2011 | Nakhle et al. |
| 2011/0206942 A1* | 8/2011 | Schiebel ............... B23K 33/004 428/608 |
| 2012/0045606 A1 | 2/2012 | Griess et al. |
| 2012/0049000 A1 | 3/2012 | Kajita et al. |
| 2013/0075526 A1 | 3/2013 | Griess et al. |
| 2013/0122236 A1 | 5/2013 | Griess et al. |
| 2013/0343805 A1 | 12/2013 | Neumann et al. |
| 2015/0024160 A1 | 1/2015 | Georgeson et al. |
| 2017/0100909 A1 | 4/2017 | Georgeson et al. |

FOREIGN PATENT DOCUMENTS

| | | | |
|---|---|---|---|
| EP | 1503301 | 2/2005 | |
| EP | 1840775 | 10/2007 | |
| EP | 2650120 A2 | 10/2013 | |
| GB | 724758 | 2/1955 | |
| JP | WO0056541 | 9/2000 | |
| JP | 2000298734 | 10/2000 | |
| JP | 2004264993 | 9/2004 | |
| JP | 2006350499 | 12/2006 | |
| WO | WO-0056541 A1 * | 9/2000 | ............... B32B 3/18 |
| WO | WO 0056541 A1 * | 9/2000 | ............... B32B 3/18 |
| WO | WO2005087589 A1 | 9/2005 | |
| WO | WO2009055201 | 4/2009 | |
| WO | WO2009070410 | 6/2009 | |
| WO | WO2010019328 | 2/2010 | |
| WO | WO 2010031372 A1 * | 3/2010 | ........... B32K 33/004 |
| WO | WO2011046686 | 4/2011 | |
| WO | WO2012024023 | 2/2012 | |

OTHER PUBLICATIONS

Althof, et al., "Investigations of Cemented and Detachable Joints of Fiber Reinforced Plastics," Translation of "Untersuchungen an geklebten and loesbaren Verbindungen von faserverstaerkten Kunststoffen," Kunststoffe, vol. 60, No. 12, 1970, pp. 911-916, NASA Technical Translation, NASA TT F-14,041, Dec. 1971, 19 pages.

"Banis et al., ""Design for Corrosion Control,"" The Boeing Company, copyright 2014, 9 pages.Accessed Mar. 18, 2014, http://www.boeing.cojm/commercial/aeromagazine/aero_07/corrosn.html".

Cera et al., "Role-based viewing envelopes for information protection in collaborative modeling," Computer-Aided Design, col. 36, No. 9, Aug. 2004, pp. 873-886.

Ding et al., "XML-based Representation in Product Lifestyle Management," Proceedings of the 2007 11th International Conference on Computer Supported Cooperative Work in Design (CSCWD 2007), Apr. 2007, pp. 762-767.

Fink et al., "Hybrid CFRP/titanium bolted joints: Performance assessment and application to a spacecraft payload adaptor," Composites Science and Technology, Feb. 2010, vol. 70, Issue 2, pp. 305-317.

Fink, et al., "Hybrid Titanium Composite Material Improving Composite Structure Coupling," In: Proceedings of the 20th AAAF Colloquium, Materials for Aerospace Applications, Nov. 2003, 7 pages.

Guillermin et al., "Advanced CAD Software Tools for Cost-Effective Composite Engineering," Proceedings of the 46th International SAMPE Symposium, vol. 2, May 2001, pp. 1899-1910.

International Search Report and Written Opinion of the International Searching Authority, dated Aug. 5, 2011, regarding Application No. PCT/US2011/041519, 10 pages.

International Search Report and Written Opinion of the International Searching Authority, dated Jan. 25, 2011, regarding Application No. PCT/US2010/047886, 13 pages.

International Search Report and Written Opinion of the International Searching Authority, dated Mar. 5, 2009, regarding Application No. PCT/US2008/081793, 14 pages.

International Search Report and Written Opinion of the International Searching Authority, dated Oct. 15, 2009, regarding Application No. PCT/US2009/049931, 12 pages.

International Search Report, dated Jun. 8, 2009, regarding Application No. PCT/US2008/078095, 4 pages.

(56) References Cited

OTHER PUBLICATIONS

Kanga, "Application of Intelligent Computer-Aided Design Techniques to Power Plant Design and Operation," IEEE Transactions on Engergy Conversion, vol. EC-2, No. 4, Dec. 1987, pp. 592-597.
Kolesnikov et al., "CFRP/titanium hybrid materials for improving composite bolted joints," Composites Structures, Jun. 2008, vol. 83, No. 4, pp. 368-380.
Li et al., "Research on the collaborative virtual products development on Web and X3D," Proceedings of the 16th International Conference on Artificial Reality and Telexistence (ICAT '06), Nov. 2006, pp. 141-144.
Partial European Search Report, dated Aug. 1, 2013, regarding Application No. EP13162774.7, 6 pages.
Prakash et al., "Computer Graphics in the Design and Manufacture of Composite Laminate Components," Computers & Graphics, col. 17, No. 4, Jul. 1993, pp. 407-413.
Prakash, "AUTOLAY—a GUI-based design and development software for laminated composite components," Computers & Graphics, vol. 23, No. 1, Feb. 1999, pp. 95-110.
Office Action, dated Apr. 29, 2011, regarding U.S. Appl. No. 11/945,121, 16 pages.
Final Office Action, dated Oct. 28, 2011, regarding U.S. Appl. No. 11/945,121, 15 pages.
Office Action, dated Sep. 9, 2010, regarding U.S. Appl. No. 11/924,107, 25 pages.
Final Office Action, dated Dec. 27, 2010, regarding U.S. Appl. No. 11/924,107, 21 pages.
Office Action, dated Dec. 7, 2011, regarding U.S. Appl. No. 11/924,107, 32 pages.
Notice of Allowance, dated Jul. 20, 2012, regarding U.S. Appl. No. 11/924,107, 18 pages.
Office Action, dated Jul. 20, 2011, regarding U.S. Appl. No. 12/192,162, 29 pages.
Final Office Action, dated Nov. 9, 2011, regarding U.S. Appl. No. 12/192,162, 14 pages.
Notice of Allowance, dated Feb. 17, 2012, regarding U.S. Appl. No. 12/192,162, 9 pages.
Notice of Allowance, dated May 21, 2012, regarding U.S. Appl. No. 12/192,162, 16 pages.
Office Action, dated Apr. 5, 2011, regarding U.S. Appl. No. 12/192,168, 21 pages.
Final Office Action, dated Sep. 30, 2011, regarding U.S. Appl. No. 12/192,168, 13 pages.
Office Action, dated Aug. 3, 2012, regarding U.S. Appl. No. 12/192,168, 27 pages.
Notice of Allowance, dated Jan. 15, 2013, regarding U.S. Appl. No. 12/192,168, 19 pages.
Office Action, dated Nov. 13, 2012 regarding U.S. Appl. No. 12/857,835, 14 pages.
Office Action, dated Jan. 31, 2014, regarding U.S. Appl. No. 13/716,171, 38 pages.
Notice of Allowance, dated Jul. 7, 2014, regarding U.S. Appl. No. 13/716,171, 7 pages.
Office Action, dated Aug. 6, 2014, regarding U.S. Appl. No. 13/443,687, 42 pages.
Notice of Allowance, dated Nov. 21, 2014, regarding U.S. Appl. No. 13/443,687, 11 pages.
Office Action, dated Mar. 30, 2016, regarding U.S. Appl. No. 14/510,736, 44 pages.
Notice of Allowance, dated Aug. 10, 2016, regarding U.S. Appl. No. 14/510,736, 12 pages.
Office Action, dated Mar. 31, 2017, regarding U.S. Appl. No. 15/384,767, 8 pages.
Extended European Search Report, dated Feb. 25, 2016, regarding application No. EP15189048.0, 9 pages.
Notice of Allowance, dated Nov. 8, 2017, regarding U.S. Appl. No. 15/384,767, 30 pages.

* cited by examiner

MULTI-LAYER METALLIC STRUCTURE AND COMPOSITE-TO-METAL JOINT METHODS

CROSS REFERENCE TO RELATED APPLICATIONS

This application is a divisional of application Ser. No. 13/443,687, filed Apr. 10, 2012, which is a continuation-in-part of U.S. patent application Ser. No. 12/857,835 filed Aug. 17, 2010, issued as U.S. Pat. No. 8,652,606 on Feb. 18, 2014, the entire disclosure of which is incorporated by reference herein.

BACKGROUND INFORMATION

1. Field:

This disclosure generally relates to composite structures, especially fiber reinforced resin laminates, and deals more particularly with a hybrid composite having a composite-to-metal joint, as well as to a bonded metal laminate used in the joint.

2. Background:

Bonding techniques are often used to assemble composite structures. In applications where the composite structure also requires fasteners, the local thickness or gauge of the structure surrounding the fastener may need to be increased in order to withstand loads transmitted through the fastener joint. As the local thickness of the structure increases, the fastener may need to be lengthened, thereby adding weight to the structure. Additionally, the increased local thickness of the structure may increase the eccentricity of the load path across the fastener joint, which may place undesired bending loads on the fastener.

One solution to the problems mentioned above consists of attaching metal fittings to the composite structure in the area of the fasteners. These metal fittings may be formed of titanium or similar metals that may not substantially chemically react with carbon fiber reinforced composites in which they are in contact. Titanium fittings, however may be relatively expensive, particularly when it is necessary to form them into complex shapes.

Accordingly, there is a need for a composite resin-to-metal joint that may be used to connect substantially all metal fittings with substantially all composite resin structures, which is relatively inexpensive and easy to manufacture, and which may withstand loads transferred around fastener connection points. There is also a need for a composite resin-to-metal joint that substantially avoids chemical reactions between the all metal fitting and the all composite resin structure. Also, there is a need for a composite-to-metal joint that may reduce residual stresses in the joint following a thermal curing. Further there is a need for a bonded metal laminate that may be used in the joints and in other applications where additional strength and durability are required.

SUMMARY

The disclosed embodiments provide a hybrid-type composite structure that includes a fiber reinforced resin composite-to-metal joint that may be used to connect a substantially all-metal fitting with a substantially all composite resin structure or a different structure. The joint provides a transition between the composite and metallic structures that is suitable for use in higher performance applications, such as aerospace vehicles. This transition from a substantially all composite to a substantially all metal material may reduce or eliminate the possibility of corrosion and/or problems stemming from eccentricity. During lay-up of the composite structure, relatively thin, flexible metal sheets of metal are substituted for a number of composite plies, and the transition from composite plies to metal sheets occurs at staggered locations so as to provide adequate load transfer from the composite portion to the metal portion. The staggered transition results in an interleaving between the composite plies and the metal sheets and creates multiple bond lines that may reduce the occurrence and/or propagation of cracks or disbonds in the joint. An adhesive placed between the metal sheets binds and unitizes the sheets into a nearly solid metal fitting.

The composite-to-metal joint may be configured as a finger type, step lap joint in order to reduce residual stresses that may be induced in the joint during cooling of the hybrid composite structure following a thermal cure cycle. The bonded metal sheets employed in the joint form a metal laminate that may be used in a variety of other applications, and which exhibits improved performance compared to monolithic metal structures. In some applications, the composite-to-metal joint utilizing the metal laminate may be used to reinforce an edge of a composite structure or to reinforce an area of a composite structure around fasteners. Additional advantages of the disclosed composite-to metal joint may include improved joint robustness, reduced weight, improved safety, less maintenance, weight savings, improved inspectability, strength improvements, and reduced manufacturing costs. The disclosed metal laminate used in the composite-to-metal joint may enable a structure to have weight and fatigue characteristics of composite resin laminates while providing the strength and durability of a metal structure. The composite-to-metal joint may reduce or avoid the need for machined end-fittings for some composite resin structure applications. A shorter bond length resulting from use of the disclosed joint may minimizes residual (or cured in) stresses due to CTE (coefficient of thermal expansion) mismatch between the metallic and composite materials forming the joint, and may also benefit the in-service performance of the joint where service temperatures can vary 225 degrees F. or more.

According to one disclosed embodiment, a metal structure is provided that exhibits improved strain performance. The metal structure comprises at least a first metal laminate including a first plurality of metal sheets bonded together. The metal structure further comprises a plurality of layers of a bonding adhesive forming adhesive bonds between the metal sheets. The metal laminate includes at least one through hole therein adapted to receive a fastener. The metal structure may further comprise a second metal laminate including a second plurality of metal sheets bonded together, and at least one fastener joining the first and second metal laminates together.

According to another disclosed embodiment, an integrated attachment fitting is provided for a structure. The attachment fitting comprises a composite resin portion, a metal portion, and a composite-to-metal joint between the composite resin portion and the metal portion. The composite resin portion includes a plurality of fiber reinforced resin plies, and the metal portion includes a plurality of metal sheets bonded together. The composite-to-metal joint includes overlapping steps between the fiber reinforced resin plies and the metal sheets. The composite-to-metal joint may comprise a finger joint. In one application, the structure may comprise an aircraft vertical stabilizer, and the metal portion may be a metal laminate attachment lug having a through-hole therein adapted to receive a bolt for attaching the lug to an aircraft fuselage. The composite resin portion forms part of the aircraft vertical stabilizer. In another application, the structure may be an aircraft wing, and the metal portion is a metal laminate having a plurality of through-holes therein adapted to receive fasteners for attaching the wing to a center wing box on an aircraft fuselage. The composite-to-metal joint may be one of a finger lap joint, a tapered lap joint, a vertical lap joint, and a lap joint having a variable overlap. In a further application, the structure may be a rotor blade having a root adapted to be attached to a rotating hub, and the metal portion includes a metal laminate located at the root, wherein the metal laminate has a through-hole therein adapted to receive a retention bolt for retaining the rotor blade on the rotating hub. In still another application, the composite-to-metal joint is an overlapping splice joint adapted to join two fuselage sections of an aircraft.

According to a further embodiment, a fastener reinforcement is provided for reinforcing an area of a multi-ply composite structure. The fastener reinforcement comprises a metal laminate including a plurality of metal sheets bonded together, wherein the metal laminate has a through-hole adapted to receive a fastener therein. The fastener reinforcement further comprises a composite-to-metal joint between the metal laminate and the composite structure. The meal sheets have edges that are interleafed with the plies of the composite structure.

According to another disclosed embodiment, a method is provided of fabricating a composite structure, comprising assembling at least a first stack of metal sheets, and laminating the first stack of metal sheets together by placing a layer of adhesive between each of the metal sheets. The method further comprises assembling a second stack of metal sheets, laminating the second stack of metal sheets together by placing a layer of adhesive between each of the metal sheets, and fastening the first and second stacks of metal sheets by passing fasteners through the first and second stacks of metal sheets.

According to still another embodiment, a method is provided of reinforcing an area of a composite laminate containing a fastener passing through the thickness of the composite laminate. The method comprises integrating a multi-ply metal laminate into the area of the composite laminate to be reinforced, and forming a through-hole in the metal laminate for receiving the fastener. Integrating the metal laminate is performed by interleafing plies of the metal laminate with plies of the composite laminate to form a finger joint between the metal laminate and the composite laminate. According to a further disclosed embodiment, a method is provided of reinforcing an edge of a multi-ply fiber reinforced resin laminate. The method comprises joining a metal laminate to the resin laminate along the edge of the resin laminate. Joining the metal laminate to the resin laminate is performed by interleafing edges of the plies of the metal laminate and the resin laminate. The interleafing may be performed in a manner to form a finger joint between the metal laminate and the resin laminate.

BRIEF DESCRIPTION OF THE ILLUSTRATIONS

DETAILED DESCRIPTION

Figure 1:
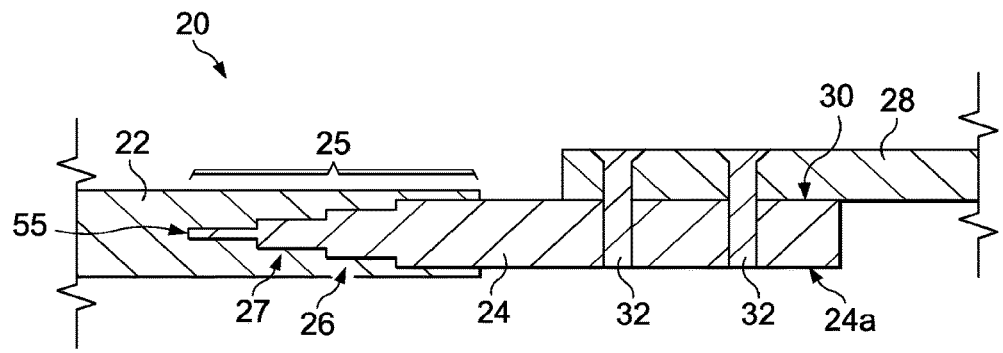
FIG. 1 is an illustration of a sectional view of a composite structure having a composite-to-metal joint.

Referring first to FIG. 1, a hybrid composite structure 20 includes a composite resin portion 22 joined to a metal portion 24 by a transition section 25 that includes a composite-to-metal joint 26. In the illustrated example, the composite structure 20 is a substantially flat composite sheet, however depending upon the application, the structure 20 may have one or more curves, contours or other geometric features. For example, composite structure 20 may comprise an inner and/or outer contoured skin 20 of an aircraft (not shown) which is secured to a frame portion 28 of the aircraft by means of a lap joint 30 and fasteners 32 which pass through the composite structure 20 into the frame portion 28.

The frame portion 28 may comprise a composite, a metal or other rigid material, and the metal portion 24 of the structure 20 may serve as a rigid metal fitting 24 that is suited to transfer a range of loads and types of loadings between the frame portion 28 and the composite portion 20. As will be discussed below in more detail, the metal portion 24 may comprise any of various metals such as, without limitation, titanium that is substantially non-reactive to and compatible with the composite portion 22 and the frame portion 28. In one practical embodiment for example, and without limitation, the composite resin portion 22 may comprise a carbon fiber reinforced epoxy, the metal portion 24 may comprise a titanium alloy, and the frame 28 may comprise an aluminum alloy or a composite. The transition section 25 and the joint 26 are strong enough to carry the typical range and types of loads between the composite resin portion 22 and the metal portion 24, including but not limited to tension, bending, torsion and shear loads. Although the illustrated transition section 25 and joint 26 are formed between an all composite resin portion 22 and the all metal portion 24, it may be possible to employ them to join two differing composite structures (not shown) or two differing metal structures (not shown).

Referring to FIGS. 1-4, a layup of composite material plies 35 is terminated at a interface location 39 referred to later herein as a transition point 39, where a metal sheet or ply 37 of the substantially the same thickness as the composite material plies 35 continues to the metal edge 24a of the metal portion 24, and the layup is repeated with a composite-to-metal interface 39 that is staggered toward the metal edge 24a from the prior interface location 39 and includes a ply of structural metal adhesive 45 (see FIGS. 5 and 6) between the metal plies 37, with the next composite-to-metal interface 39 staggered away from the metal edge 24a to produce a nested splice 27. This staggered interface stacking, which produces nested tabs 29 (see FIG. 3), is continued to the full thickness of the hybrid composite structure 20 with none of the composite plies 35 extending fully to the metal edge 24a of the all metal portion 24

Figure 2:
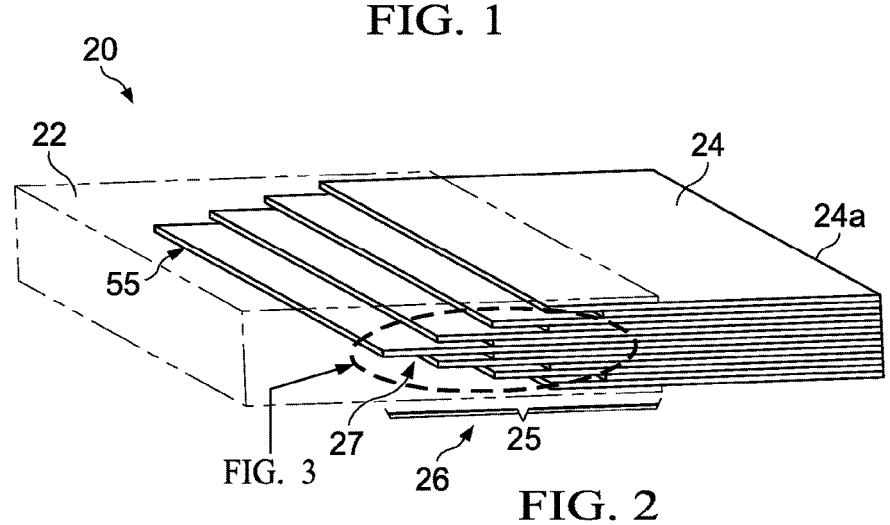
FIG. 2 is an illustration of a perspective view of the composite structure including the composite-to-metal joint.
Figure 3:
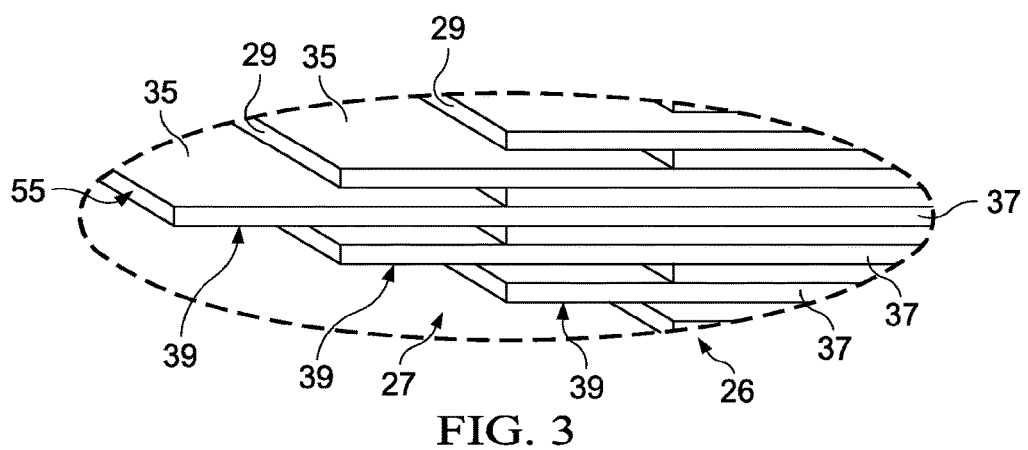
FIG. 3 is an illustration of a perspective view of the area designated as FIG. 3 in FIG. 2.
Figure 4:
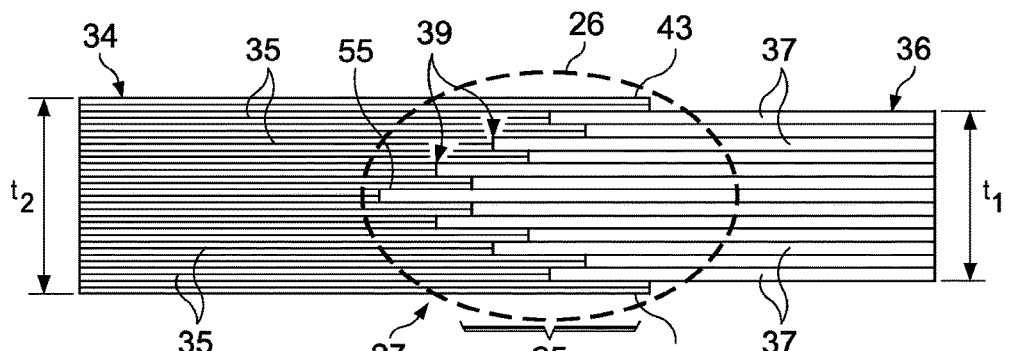
FIG. 4 is an illustration of a cross sectional view of the joint, better showing interleaving between composite plies and the metal sheets.
Figure 5:
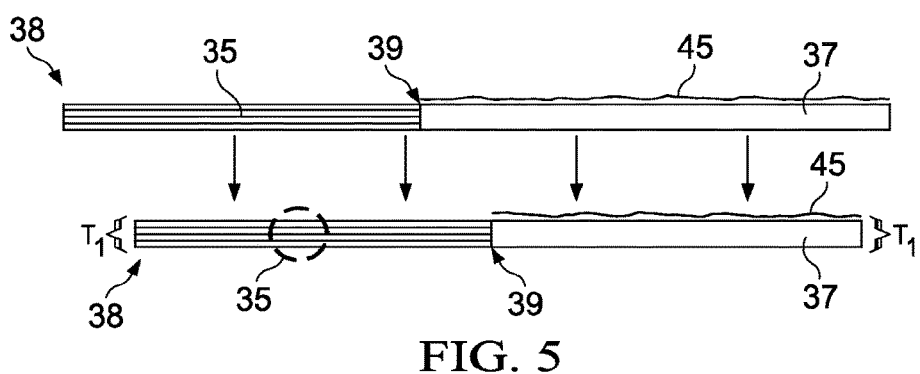
FIG. 5 is an illustration of a cross sectional view of two separated layers of the joint shown in FIG. 4, also showing the application of a film adhesive on the metal sheets.
Figure 6:
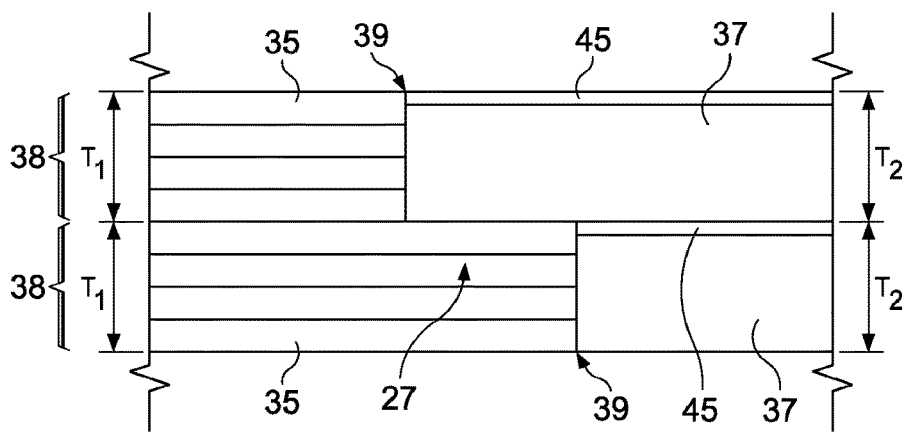
FIG. 6 is an illustration of an enlarged, cross sectional view of a portion of the joint formed by the two layers shown in FIG. 5.

Referring now also to FIGS. 2-4, the composite portion 22 of the structure 20 comprises a laminated stack 34 of fiber reinforced resin plies 35, and the metal portion 24 of the structure 20 comprises a stack 36 of metal sheets or plies 37 that are bonded together to form a laminated, substantially unitized metal structure. As shown in FIGS. 5 and 6, the composite plies 35 and the metal sheets 37 are arranged in layers 38. Each of the layers 38 comprises one or more of the composite plies 35 in substantially edge-to-edge abutment with one of the metal sheets 37. Thus, each of the layers 38 transitions at a point 39 from a composite i.e. composite resin plies 35, to a metal, i.e. metal sheet 37.

The transition points 39 are staggered relative to each other according to a predetermined lay-up schedule such that the plies 35 and the metal sheets 37 overlap each other in the transition section 25 (FIG. 1). Staggering of the transition points 39 creates multiple bond lines that may reduce the occurrence and/or propagation of cracks or disbonds in the joint 26. The staggering of the transition points 39 also results in a form of interleaving of the composite plies 35 and the metal sheets 37 within the joint 26 which forms a nested splice 27 between the all composite portion 22 and the all metal portion 24. This nested splice 27 may also be referred to as a finger bond 26, a finger joint 26 or a multiple step lap joint 26. The adjacent ones of the transition points 39 are spaced from each other in the in-plane direction of the structure 20 so as to achieve a bonded joint 26 that exhibits optimum performance characteristics, including strength and resistance to disbonds and propagation of inconsistencies such as cracks. In the illustrated example, the nested splice 27 forming the joint 26 is a form of a double finger joint in which the transition points 39 are staggered in opposite directions from a generally central point 55 of maximum overlap. However, as will be discussed blow in more detail, other joint configurations are possible including but not limited to a single finger joint in which the multiple transition points 39 are staggered in a single direction.

The composite plies 35 may comprise a fiber reinforced resin, such as without limitation, carbon fiber epoxy, which may be in the form of unidirectional prepreg tape or fabric. Other fiber reinforcements are possible, including glass fibers, and the use of non-prepreg materials may be possible. The composite plies 35 may have predetermined fiber orientations and are laid up according to a predefined ply schedule to meet desired performance specifications. As previously mentioned, the bonded sheets 37 may comprise a metal such as titanium that is suitable for the intended application. In the illustrated example, the stack 36 of metal sheets 37 has a total thickness $t_1$ which is generally substantially equal to the thickness $t_2$ of the laminated stack 34 of plies 35. In the illustrated example however, $t_2$ is slightly greater than $t_1$ by a factor of the thickness of several overwrap plies 43 on opposite sides of the stack 37.

The use of a multiple step lap joint 26 may increase the bond area along the length of the transition section 25, compared to a scarf type joint or other types of joints which may require a longer length transition section 25 in order to achieve a comparable bond area between the composite resin portion 22 and the metal portion 24. Following thermal curing, cooling of the hybrid composite structure 20 may result in residual stresses in the joint 26 due to a mismatch between the coefficient of thermal expansion (CTE) of the composite resin portion 22 and the metal portion 24. The amount of thermal expansion during curing is a function of the CTE of the composite resin portion 22 and the metal portion 24, as well as the length of the transition section 25. Use of the step lap joint 26, rather than a scarf type or other type of joint may reduce the amount of these residual stresses because of the reduction in the length of the transition section 25 that is needed to obtain a preselected amount of bond area between the two portions 22, 24 of the joint 26. Reduction of the length of the transition section 25 may also reduce residual stresses in the joint 26 after the aircraft is placed in service where large temperature extremes may be encountered during either normal or extreme operations.

FIGS. 5 and 6 illustrate details of two adjoining layers 38 of the joint 26 shown in FIGS. 2-4. In this example, each layer 38 comprises four plies 35 having a collective total thickness $T_1$. The individual metal sheets 37 of the adjacent layers 38 are bonded together by means of a layer of structural adhesive 45, which may comprise a commercial film adhesive or other forms of a suitable adhesive that is placed between the metal sheets 36 during the lay-up process.

The combined thickness of each metal sheet 37 and one layer of adhesive 45 represented as $T_2$ in FIG. 5 is substantially equal to the thickness $T_1$ of the composite plies 35 in the layer 38. Although not shown in the Figures, a thin film of adhesive may be placed between the plies 35 to increase the interlaminar bond strength. In one practical embodiment, titanium alloy metal sheets 37 may be used which each have a thickness of approximately 0.025 inches, the film adhesive 45 may be approximately 0.05 inches thick, and four composite carbon fiber epoxy plies 35 may be used in each layer 38 having a collective total thickness of about 0.03 inches. Depending on the application, the use of metals other than titanium may be possible. The distance between adjacent transition points 39, and thus the length of the overlap between the layers 38, as well as the thickness and number of composite plies 35 and the thickness of the metal sheets 37 will depend on the requirements of the particular application, including the type and magnitude of the loads that are to be transmitted through the joint 26, and possibly other performance specifications. It should be noted here that the bonded metal sheets 37 is not limited to use in a composite metal joint 26 discussed above. As will be discussed later below, a metal structure comprising bonded metal sheets 37 has a variety of other applications because of the superior strain performance it may exhibit, compared to monolithic metal structures.

The differing layers 38 of the joint 26 between the two differing materials of the composite and metal portions 22, 24 respectively (FIG. 1), render the structure 20 well suited to nondestructive evaluations of bond quality using embedded or mounted sensors (not shown). Ultrasonic structural waves (not shown) may be introduced into the structure 20 at the edge of the metal portion 24, at the composite portion 22 or in the transition section 25. These ultrasonic waves travel through what amounts to a waveguide formed by the metal sheets and the interfaces (not shown) between the composite plies 35 and the metal sheets 37. MEMS-based (microelectromechanical) sensors, thin piezo-electric sensors (not shown) or other transducers placed in the structure 20 may be used to receive the ultrasonic structural waves for purposes on analyzing the condition of the bondlines in the joint 26.

Figure 7:
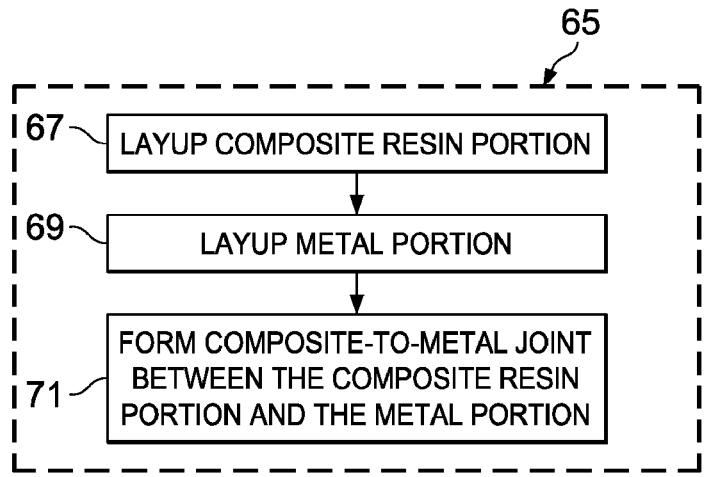
FIG. 7 is an illustration of a broad flow diagram of a method of making a composite structure having the composite joint shown in FIGS. 2-4.

Referring now to FIG. 7, one method of making the composite structure 20 comprises forming a multi-layer composite lay-up as shown at 65. Forming the lay-up includes laying up a composite resin portion 22 at step 67, and laying up a metal portion 24 at 69. The step 65 of forming the layup further includes forming a composite-to-metal joint between the composite resin portion and the metal portion of the lay-up, shown at 71.

Figure 8:
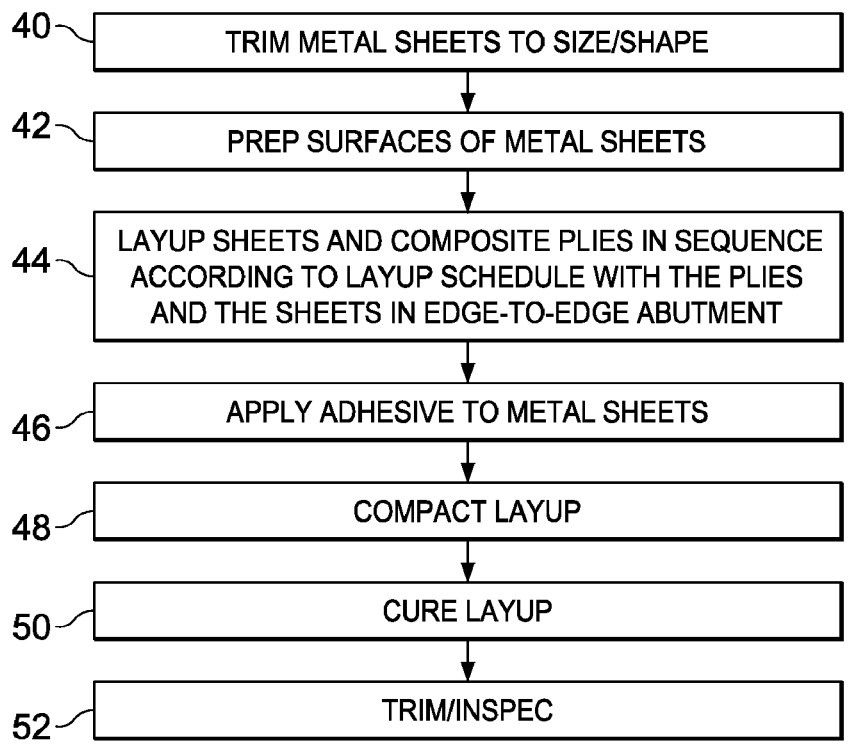
FIG. 8 is an illustration of a flow diagram showing additional details of the method shown in FIG. 7.

FIG. 8 illustrates additional details of the method shown in FIG. 7. Beginning at step 40, individual metal sheets 37 are trimmed to a desired size and/or shape. Next at 42, the surfaces of the metal sheets 37 are prepared by suitable processes that may include cleaning the sheets 37 with a solvent, drying them, etc. Then at 44, the lay-up is assembled by laying up the metal sheets 36 and the composite plies 35 in a sequence that is determined by a predefined ply schedule (not shown) which includes a predetermined staggering of the transition points 39 between the plies 35 and the metal sheet 37 in each layer 38.

During the lay-up process, the metal sheets 37 are sequenced like plies into the lay-up, much like composite plies are sequenced into a lay-up in a conventional lay-up process. As shown at step 46, adhesive may be introduced between the metal sheets 37 in order to bond them together into a unitized metal structure. Similarly, although not shown in FIG. 8, a bonding adhesive may be introduced between the individual composite plies 35 in order to increase the bond strength between these plies 35. Next, at 48, the lay-up may be compacted using any of several known compaction techniques, such as vacuum bagging following which the lay-up is cured at step 50 using autoclave or out-of-autoclave curing processes. At step 52, the cured composite structure 20 may be trimmed and/or inspected, as necessary.

Figure 9:
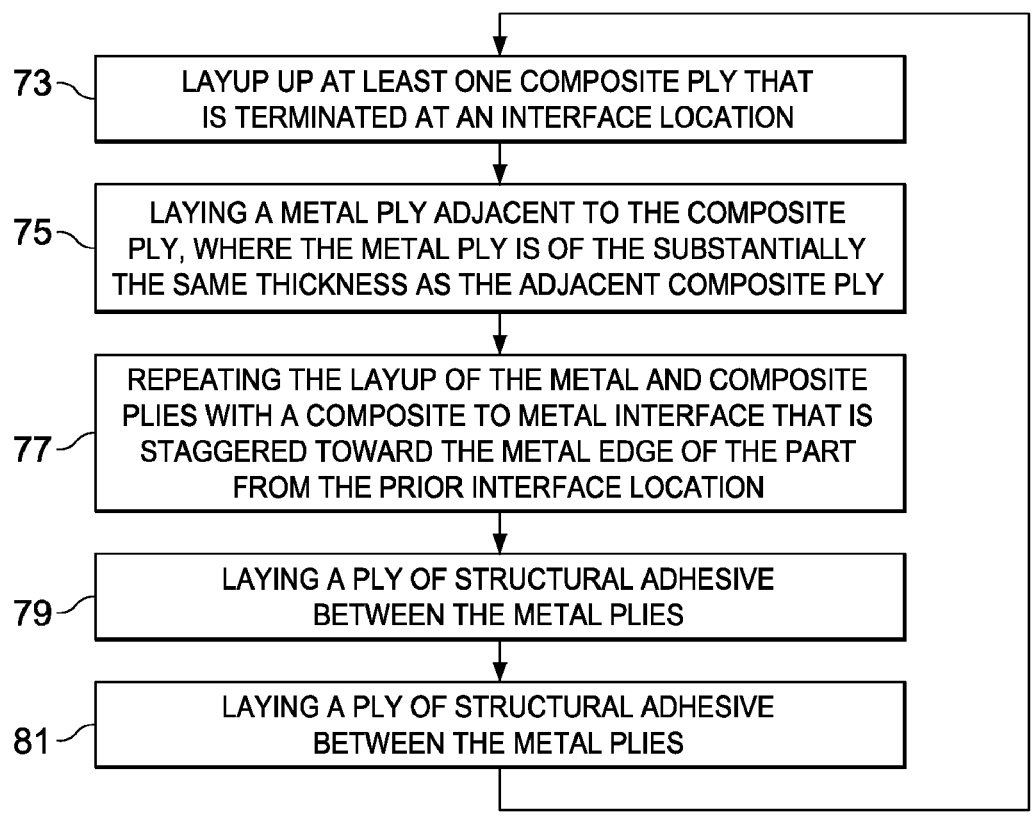
FIG. 9 is a flow diagram of another method of making a composite structure having the composite joint shown in FIGS. 2-4.

FIG. 9 illustrates still another embodiment of a method of making a hybrid composite part 20. The method begins at step 73 with laying at least one composite ply 35 that is terminated at an interface location 39 on a suitable layup tool (not shown). At 75, an adjacent metal ply 37 is laid up which is substantially the same thickness as the adjacent composite material ply 35. As shown at 77, the layup process is repeated with a composite-to-metal interface 39 that is staggered toward the metal edge 24a of the part 20 from the transition point 39. A 79, a ply 45 of structural adhesive is laid between the metal plies 37. Steps 73-79 are repeated successively to produce a nested splice 27 and a staggered interface stacking forming nested tabs 29 to the full thickness of the hybrid part 20, with none of the composite plies 35 extending fully to the metal edge 24a of the part 20. Although not shown in FIG. 9, the completed layup is vacuum bagged processed to remove voids, and is subsequently cured using any suitable curing method.

Figure 10:
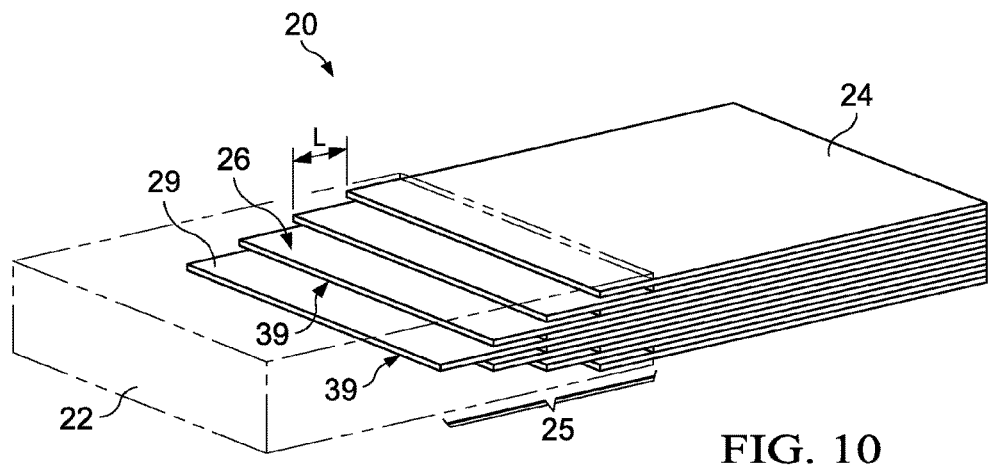
FIG. 10 is an illustration of a perspective view of a composite-to-metal finger joint having a relatively shallow double taper.
Figure 11:
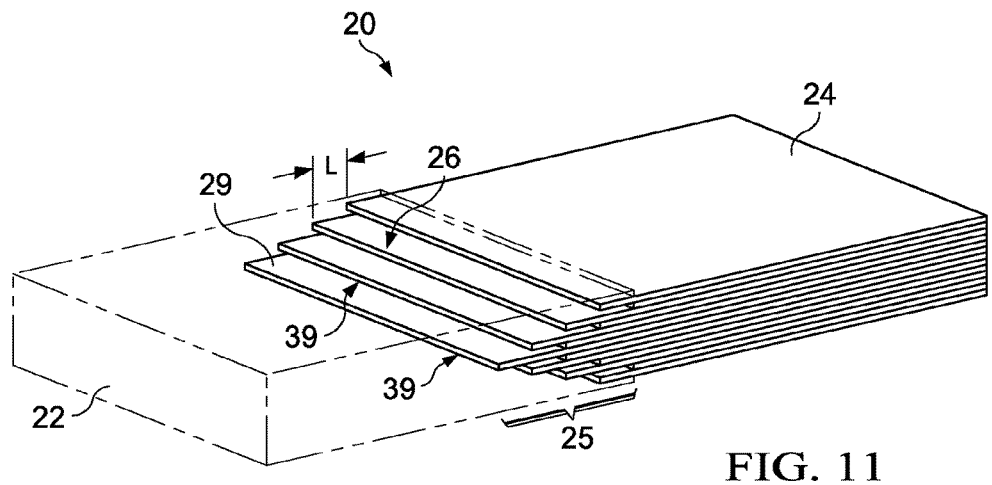
FIG. 11 is an illustration similar to FIG. 10 but showing a composite-to-metal finger joint having a relatively steep taper.

The composite-to-metal joint 26 previously described may be constructed in any of a variety of joint configurations in which the composite material plies 35 are interleafed with the metal plies 37. For example, referring to FIG. 10, the transition section 25 of the hybrid composite structure 20 may include a composite-to-metal joint 26 having a relatively shallow taper resulting from lengths L of overlap between the composite and metal plies 35, 37 that are relatively long. In the example shown in FIG. 10, the composite-to-metal joint 26 is a double tapered finger joint. In comparison, as shown in FIG. 11, shorter lengths L of the overlap between the composite and metal plies 35, 37 results in a double tapered finger joint 26 that has a relatively steep taper, in turn resulting in a shorter transition section 25 between the composite resin and metal portions 22, 24 respectively. The length L of the overlap may be optimized for the particular application.

Figure 12:
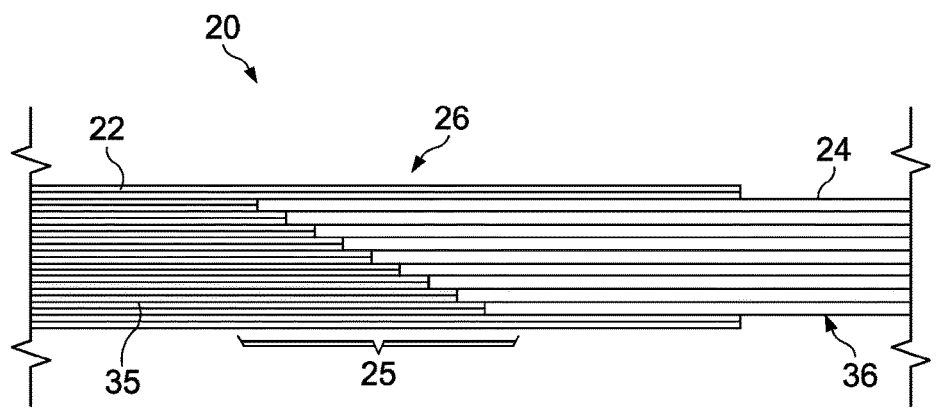
FIG. 12 is an illustration of a sectional view of a composite-to-metal joint having a single taper.
Figure 13:
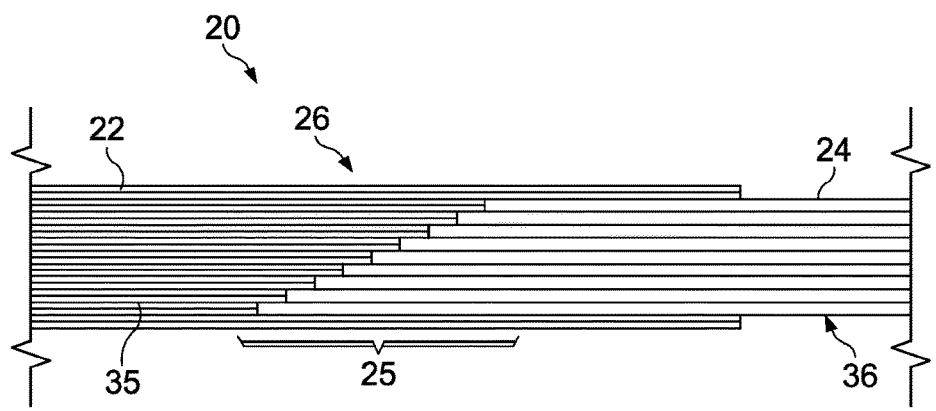
FIG. 13 is an illustration similar to FIG. 12 but illustrating a composite-to-metal joint having a reversed single taper.
Figure 14:
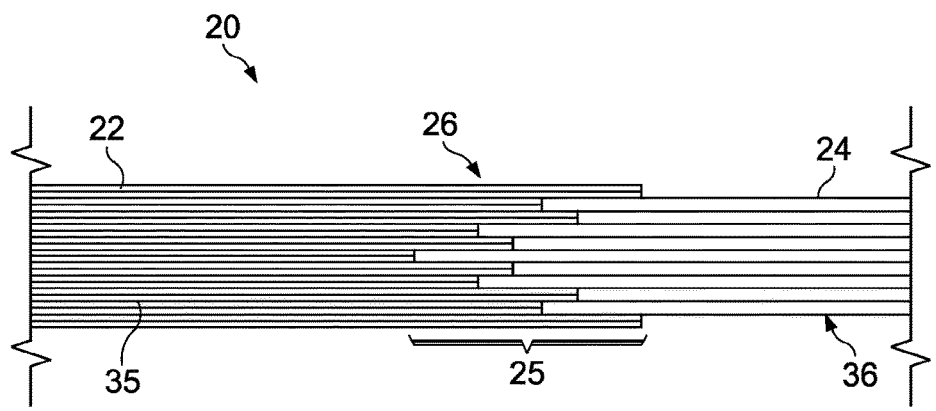
FIG. 14 is an illustration of a cross sectional view of a composite-to-metal finger joint having a symmetric double taper.
Figure 15:
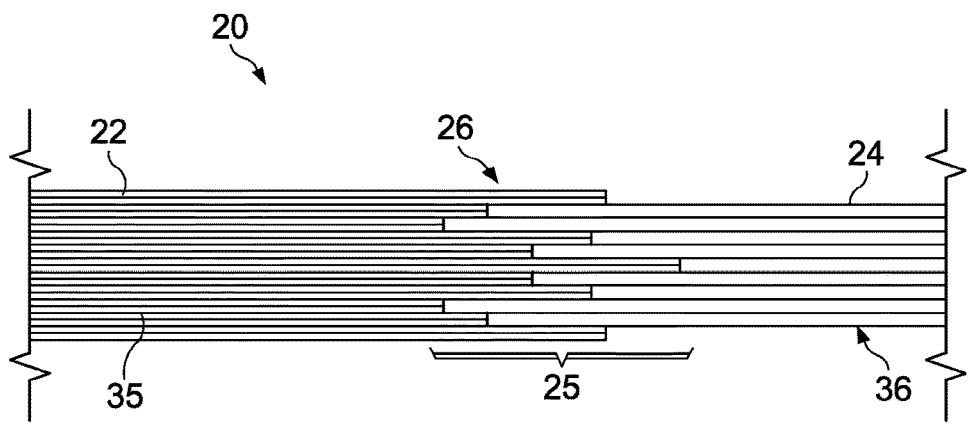
FIG. 15 is an illustration similar to FIG. 14 but illustrating a symmetric reversed double taper finger joint.
Figure 16:
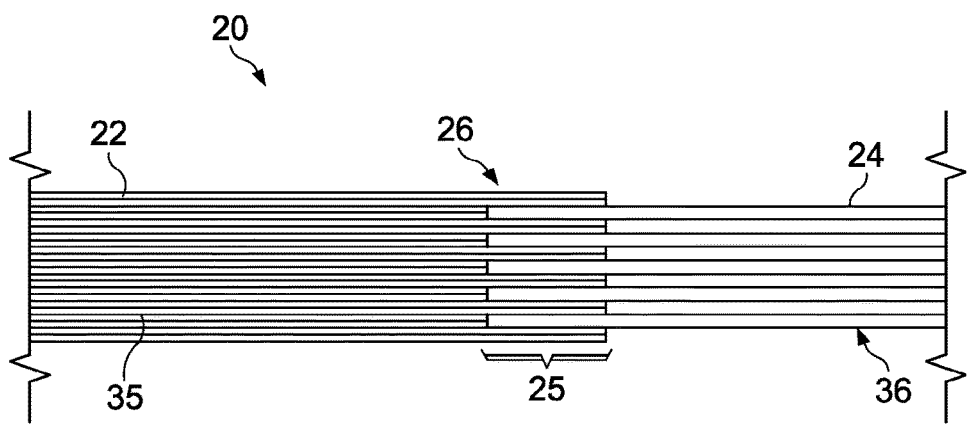
FIG. 16 is an illustration of a cross sectional view of a vertical composite-to-metal finger joint.
Figure 17:
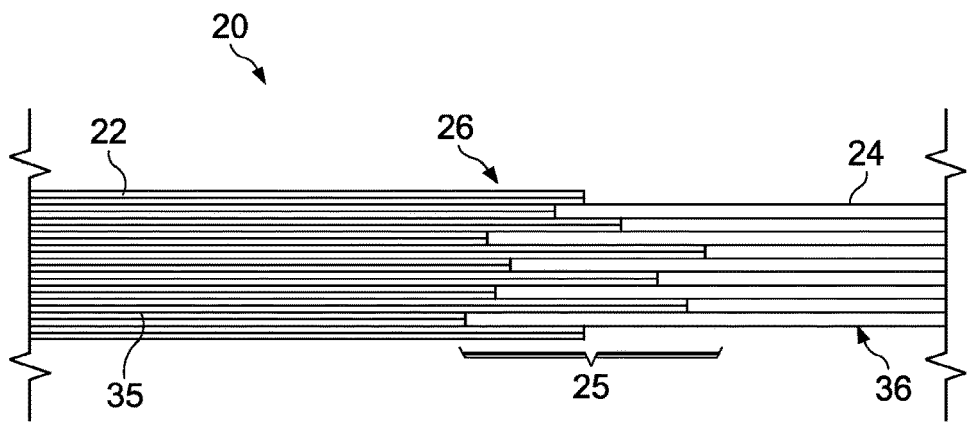
FIG. 17 is an illustration of a cross sectional view of a composite-to-metal finger joint having variable overlap between the plies.

FIGS. 12-17 illustrate other examples of composite-to-metal joint 26 configurations. In one alternative, the composite-to-metal joint 26 may comprise a double tapered finger joint 26 that includes a tapered or layered multi-ply construction above and below a composite-to-metal interface 39, wherein one or more overlap lengths, e.g., lengths L, may be chosen or optimized relative to a particular real estate constraint, area, or transitional stress or strain requirement. In one example, the real estate constraint or area may require a shorter transition section, for instance, between the composite resin and metal portions. In some applications, a transitional stress or strain requirement may require progressively less stress or strain along a portion of the structure. For example, FIG. 12 illustrates a single taper lap joint 26, while FIG. 13 illustrates a single reverse taper lap joint 26. In FIG. 14, the joint 26 is configured as a double tapered, substantially symmetrical, staggered finger lap joint while FIG. 15 illustrates a reverse double tapered finger lap joint 26. The use of the staggered finger lap joints 26 shown in FIGS. 14 and 15 may be preferred in some applications because the joint may have a CTE interface that is less than an equivalent step lap joint of a longer transition section 25 (FIG. 10). In FIG. 16, the composite-to-metal joint 26 takes the form of a vertical lap finger joint, while FIG. 17 illustrates a composite-to-metal joint 26 in which the overlap between the composite and the metal plies 35, 37 is variable through the thickness of the joint 26.

Figure 18:
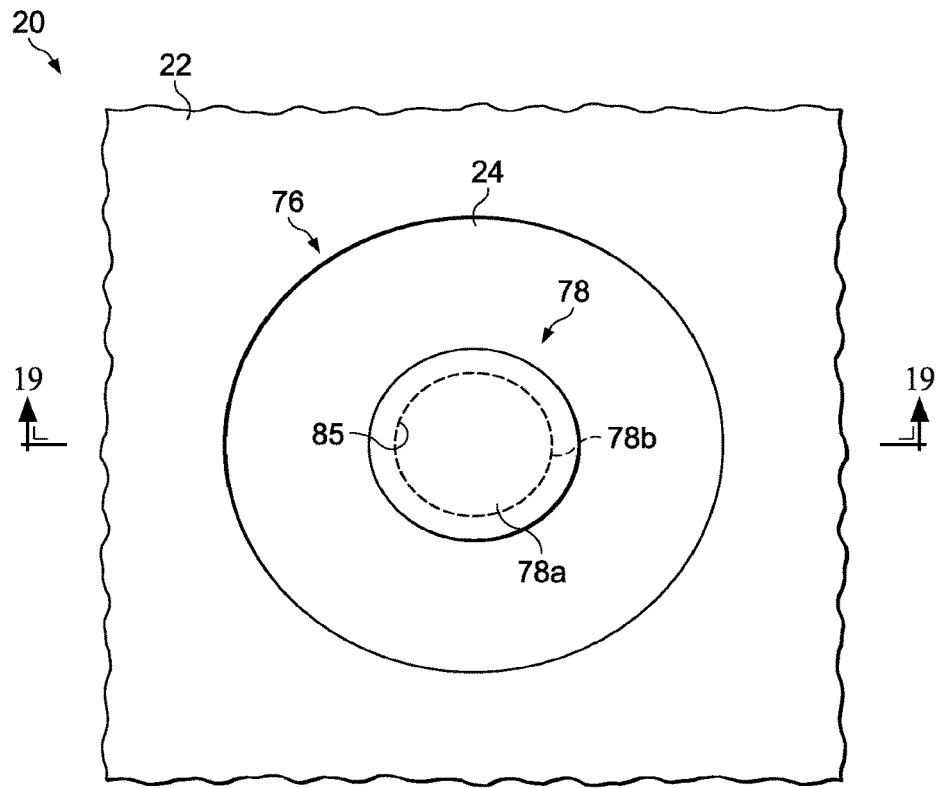
FIG. 18 is an illustration of a plan view of a composite structure having a laminated metal reinforcement around a fastener.
Figure 19:
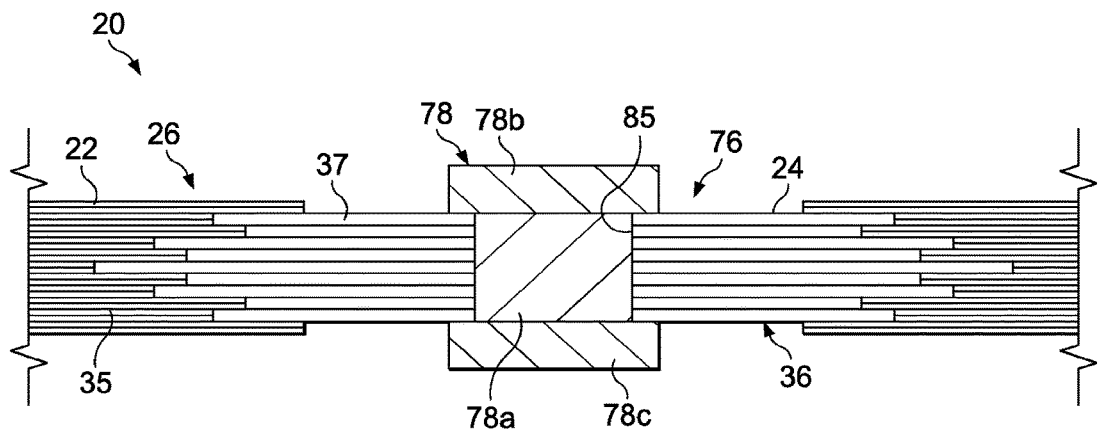
FIG. 19 is an illustration of a cross sectional view taken along the line 19-19 in FIG. 18.

Attention is now directed to FIGS. 18 and 19 which illustrate a hybrid composite structure 20 comprising a composite resin portion 22 and a metal portion 24 that forms a metal laminate reinforcement 76 around a fastener passing through the hybrid composite structure 20. The metal portion 24 forming the metal laminate reinforcement 76 comprises a stack 36 of metal sheets or plies 37 that are bonded together, similar to the metal laminates previously described. The metal laminate reinforcement 76 is connected to the surrounding composite resin portion 22 by a circumferential composite-to-metal joint 26, as shown in FIG. 19 which, in the illustrated embodiment, comprises a double tapered finger lap joint, similar to that shown in FIGS. 4, 10, and 14. In one alternative, staggered finger lap joints may include a transition region where one or more edges of composite material plies, metal plies, or combinations thereof may have varying levels of overlap or non-overlap to achieve or meet a desired CTE interface coefficient, a desired real estate constraint, an area constraint, or transitional stress or strain requirement. In one example, real estate constraint or area may require a shorter transition section, for instance, between the composite resin and metal portions or metal plies. In one example, transitional stress or strain requirement may require progressively less stress or strain along a portion of the structure.

The metal laminate reinforcement 76 includes a central through-hole 85 through which the fastener 78 passes. The fastener 78 may comprise for example and without limitation, a bolt or rivet 78 having a body 78a and heads 78b and 78c. Although not shown in the drawings, the fastener 78 may be used to attach a structure to the composite structure 20, or to secure the hybrid composite structure 20 to another structure. The metal laminate reinforcement 76 functions to strengthen the area surrounding the fastener 78 and may better enable the composite structure 20 to carry loads in the area of the fastener 78.

The composite-to-metal joint 26 previously described may be employed in a variety of applications, including those in the aerospace industry to join composite structures, especially in areas where a composite structure is highly loaded. For example, referring to FIG. 20, an airplane 80 broadly comprises a fuselage 82, left and right wings 84, a vertical stabilizer 92 and a pair of horizontal stabilizers 94, and a wing box 108. The airplane 80 may further include a pair of engines 88 surrounded by engine nacelles 86, and landing gear 90.

Figure 20:
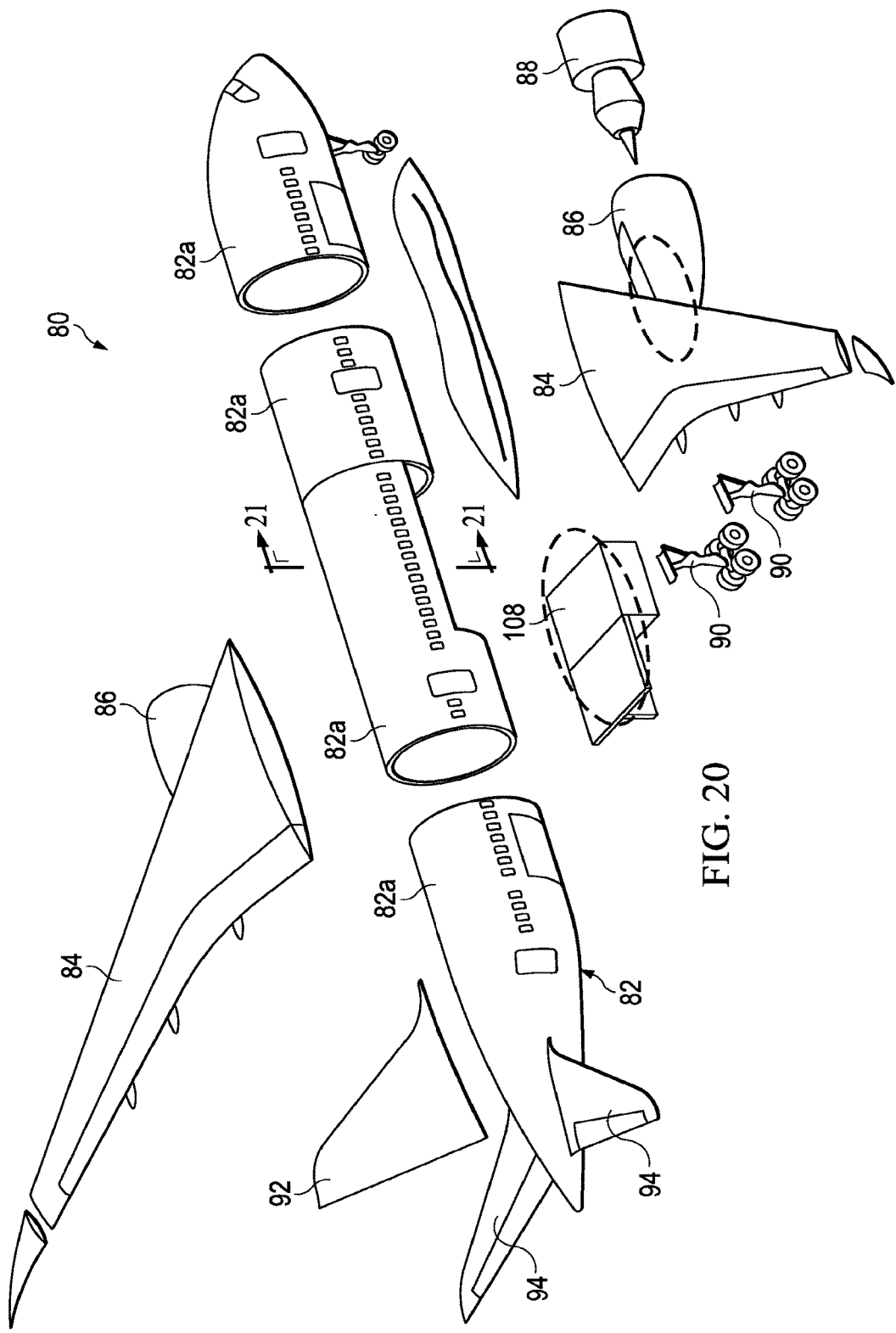
FIG. 20 is an illustration of an exploded, perspective view of a typical aircraft employing composite-to-metal joints.
Figure 21:
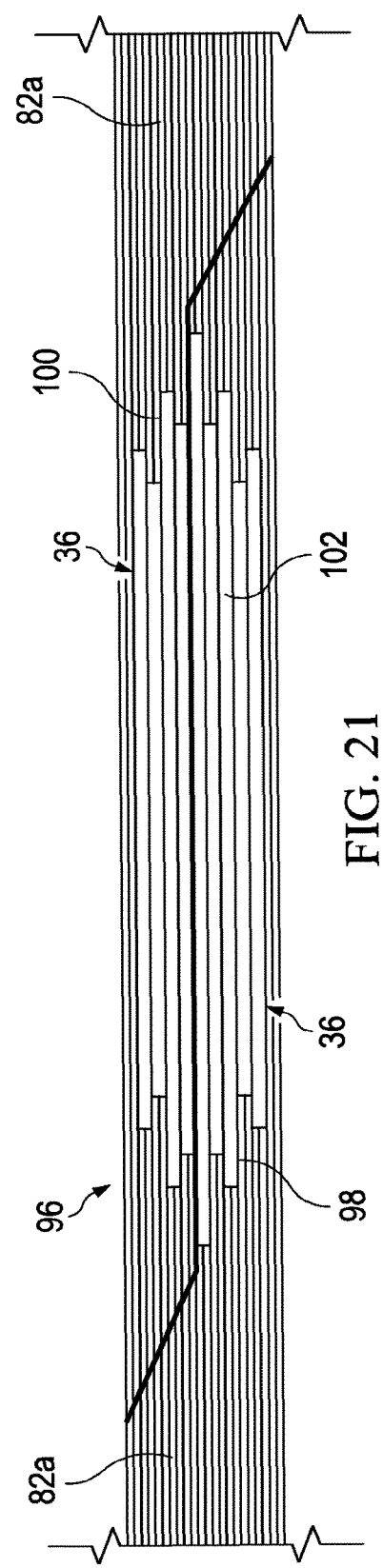
FIG. 21 is an illustration of a sectional view taken along the line 21-21 in FIG. 20, showing a typical composite-to-metal joint between fuselage sections.

The composite-to-metal joint 26 previously described may be employed to join or mount any of the components shown in FIG. 20. For example, composite-to-metal joints 26 may be employed to mount the wings 84 on the center wing box 108, as will be discussed below in more detail. Similarly, a composite-to-metal joint 26 may be employed to attach the vertical stabilizer 92 and/or the horizontal stabilizers 94 to the fuselage 82. The composite-to-metal joints 26 may be employed to mount the landing gear 90 on the wings 84, as well as to mount engines 88 and engine nacelles 86 on pylons (not shown) on the wings 84. Further, the disclosed composite-to-metal joint 26 may be employed to join fuselage sections 82a together. For example, referring to FIGS. 20 and 21, fuselage sections 82a may be joined together by a co-bonded lap joint indicated at 96, wherein each of the adjoining fuselage sections 82a comprises a metal laminate stack 36 and finger overlaps 98, 100 between composite resin and metal plies 35, 37 respectively. In this example, the metal laminate stacks 36 of the respective fuselage sections 82a may be joined together, as by bonding using a suitable bonding adhesive.

Figure 22:
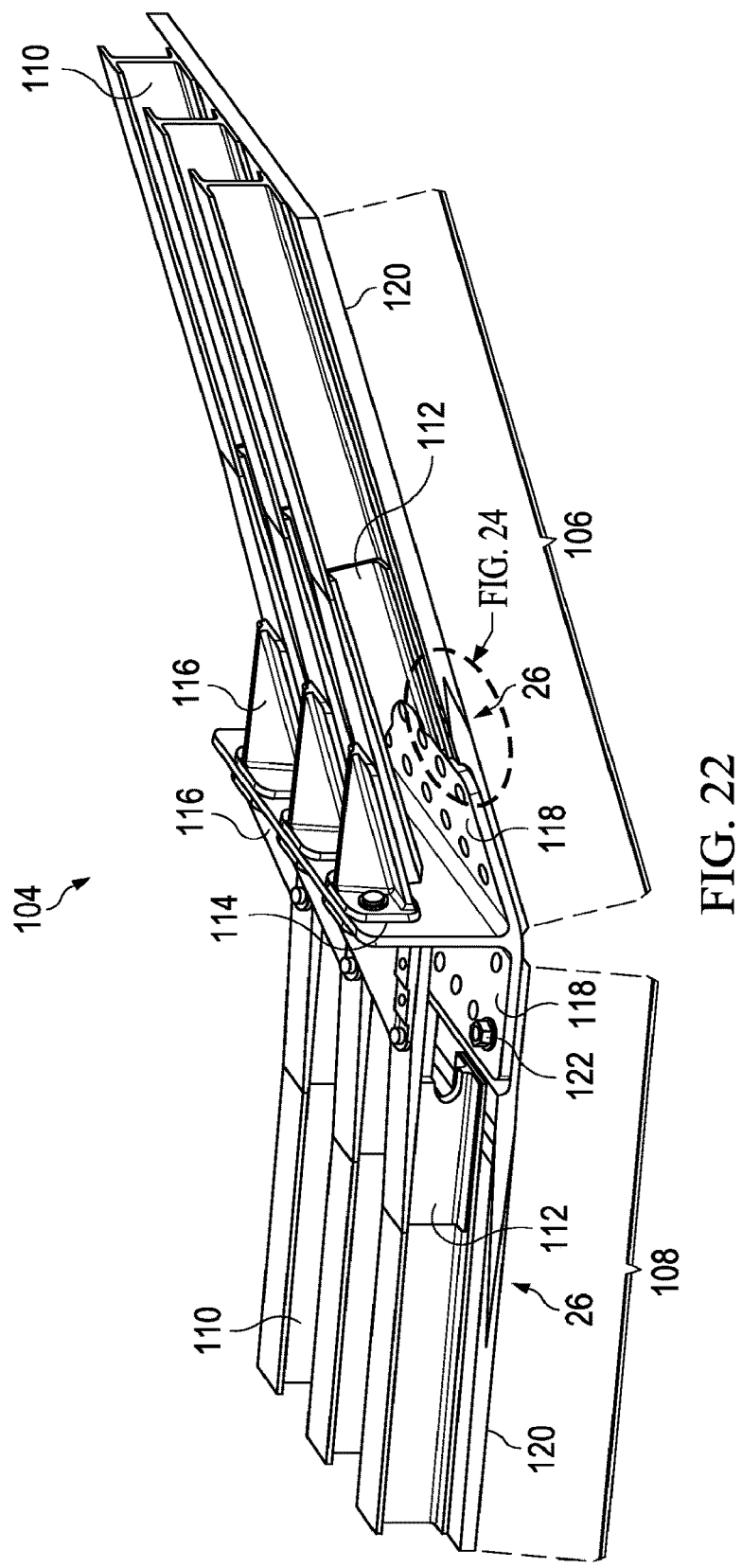
FIG. 22 is an illustration of a perspective view of a composite-to-metal joint between an aircraft wing and a center wing box.

Referring now to FIG. 22, each of the wings 84 (FIG. 20) may be attached to the center wing box 108 by an attachment joint, generally indicated at 104. Each of the wing 106 and the wing box 108 broadly comprises an outer skin 120 attached to spanwise extending spars 110. The attachment joint 104 includes an attachment fitting 114 having a pair of flanges 118 that are attached by bolts 122 or other suitable fasteners to the skins 120. The attachment joint 104 may be reinforced by C-shaped channels 112 and brackets 116.

Figure 23:
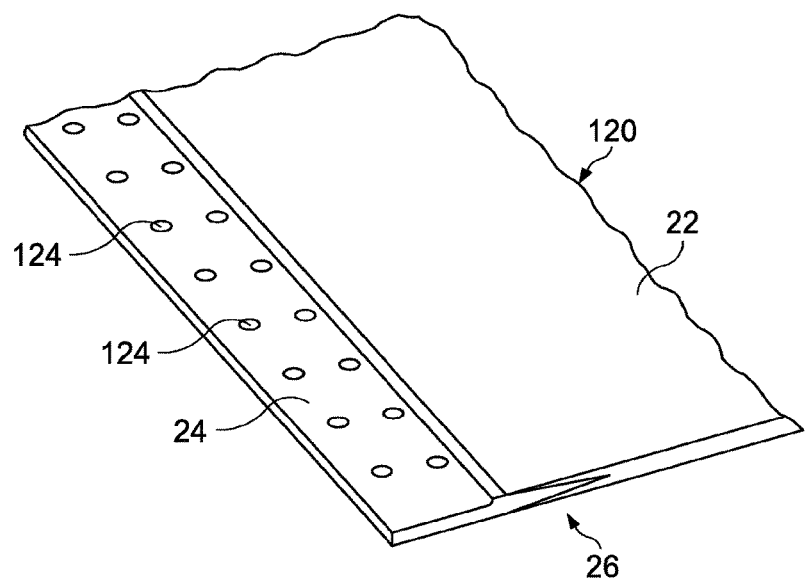
FIG. 23 is an illustration of a perspective view of a portion of a skin of the wing box shown in FIG. 22.
Figure 24:
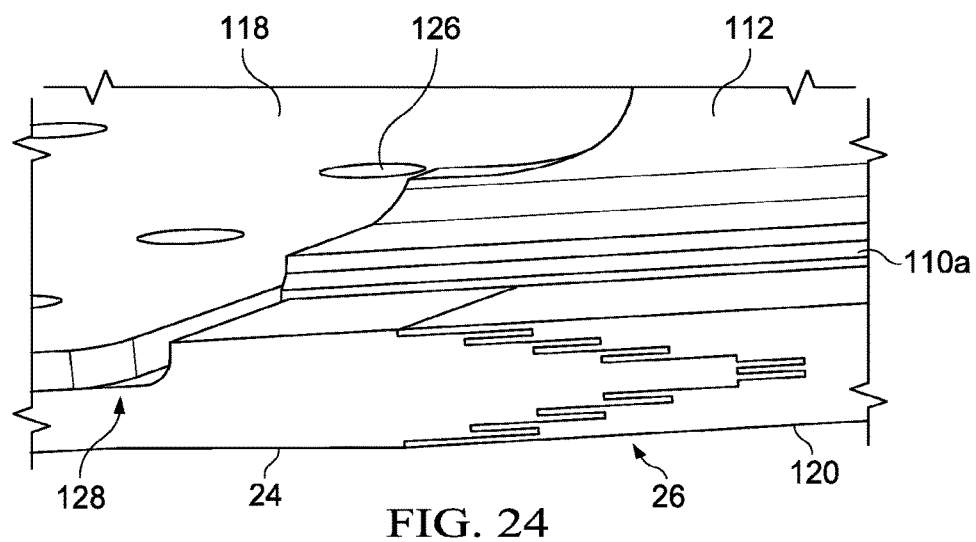
FIG. 24 is an illustration of the area designated as FIG. 24 in FIG. 22.

Referring also now to FIGS. 23 and 24, each of the skins 120 includes a metal portion 24 that also forms an integrated attachment fitting which is connected to a composite resin portion 22 by a composite-to-metal joint 26 of the type previously described. Although not shown in FIGS. 23 and 24, the metal portion 24 of the joint 26 is formed by laminated metal plies 37, and the composite resin portion of the joint 26 is formed by laminated composite resin plies 35. As particularly shown in FIG. 24, the metal portion 24 of the joint 26 may be scarfed at 128 to receive one of the flanges 118 therein. Metal portions 24 include through-holes 124 that are aligned with the through-holes 126 in the flanges 118 of the fitting 116. It may thus be appreciated that attachment joint 104 is reinforced by the presence of the metal portions 24 which are attached to the metal attachment fitting 114 by the bolts 122.

Figure 25:
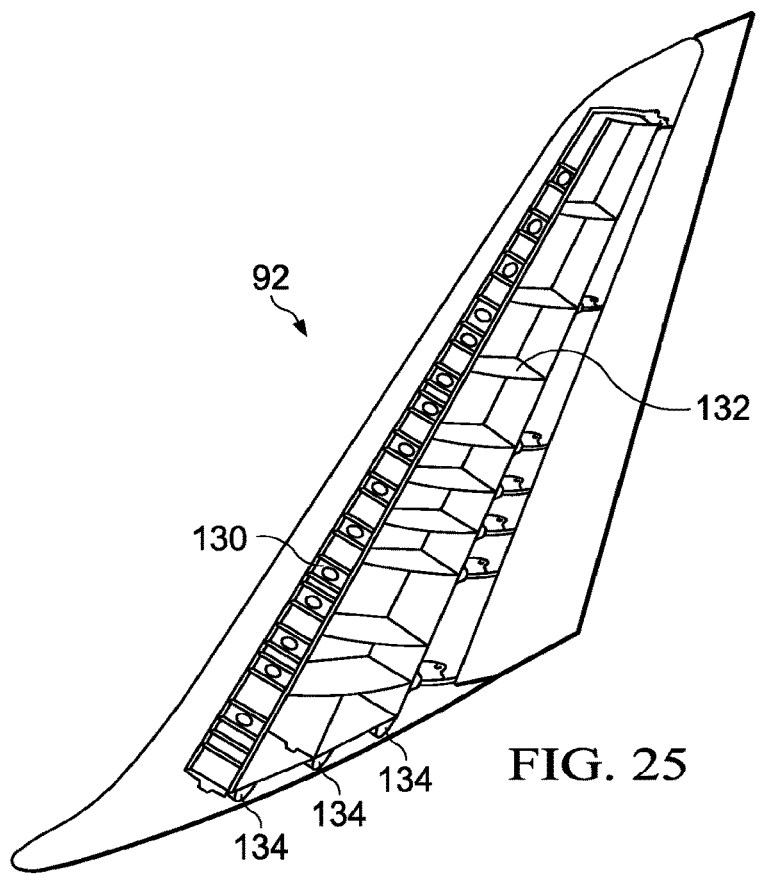
FIG. 25 is an illustration of a perspective view of an aircraft vertical stabilizer, parts being broken away in section for clarity.
Figure 26:
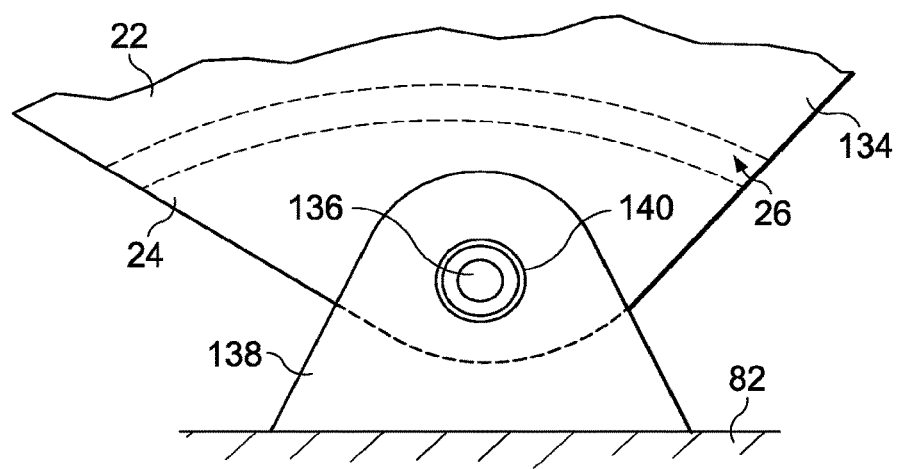
FIG. 26 is an illustration of a side view showing attachment of the stabilizer shown in FIG. 25 to a fuselage using a lug containing a composite-to-metal joint.

FIGS. 25 and 26 illustrate another application of composite-to-metal joint 26 that may be employed to attach a vertical stabilizer 92 or similar airfoil to an aircraft fuselage 82. As shown in FIG. 25, the vertical stabilizer 92 may comprise a series of generally upwardly extending spars 130 connected with ribs 132. A series of attachment lugs 134 on the bottom of the stabilizer 92 are each attached to mounting ears 138 on the fuselage 82 by means of attachment bolts 136 received within bushings 140 in the lugs 134. Each of the lugs 134 comprises a fiber reinforced composite resin portion 22 and a metal portion 24 which may comprise a metal laminate. The composite resin portion 22 is joined to the metal portion by a composite-to-metal joint 26 of the type previously described. It may thus be appreciated that while the lug 134 is lightweight because of its predominantly composite construction, the area at which the lug 134 is attached to the fuselage 82 comprises a metal portion 24 which has a load bearing capacity that may be greater than the composite resin portion 22.

Figure 27:
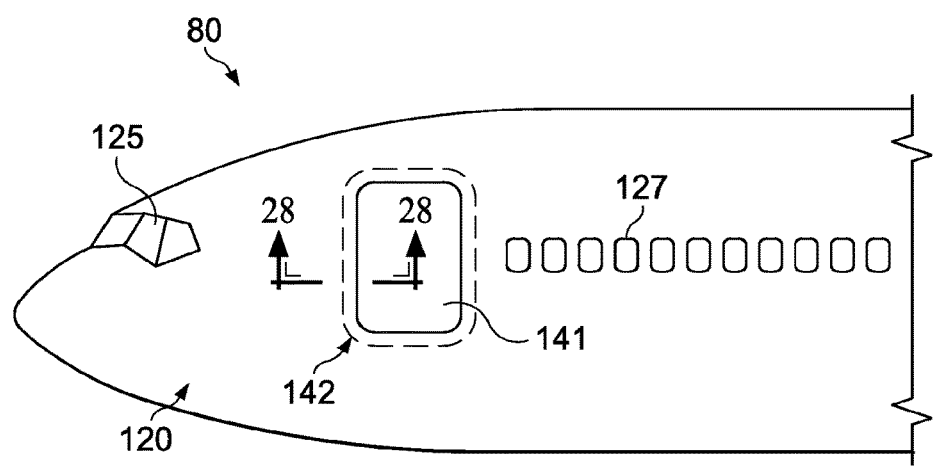
FIG. 27 is an illustration of a side view of a forward portion of an aircraft, illustrating a hatchway reinforced by a composite-to-metal joint.
Figure 28:
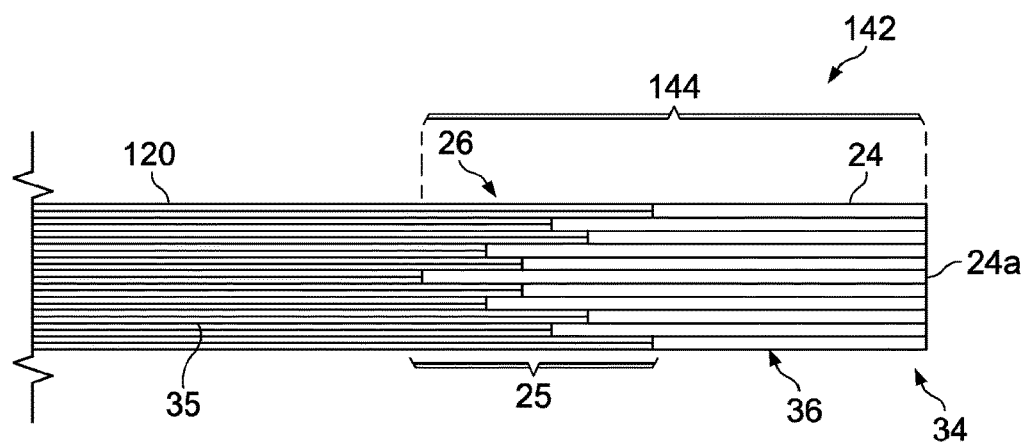
FIG. 28 is an illustration of a sectional view taken along the line 28-28 in FIG. 27.

Attention is now directed to FIGS. 27 and 28 which illustrate the use of a composite-to-metal joint 26 employed to reinforce the edges 142 of a fiber reinforced composite resin structure, which in the illustrated example comprises the skin 120 of an aircraft 80. In this example, a fuselage hatch 141 has a periphery 142 terminating in an edge 144 (FIG. 28) that is reinforced by a metal portion 24 comprising a metal laminate stack 36. The metal portion 24 is joined to the composite skin 120 by a composite-to-metal joint 26, of the type previously described. In this example, the edge 24*a* of the metal portion 24 defines the fuselage hatch 141 opening. The composite-to-fiber joint 26 may also be used to reinforce the skin 120 around other openings, such as cockpit windows 125 and passenger windows 127.

Figure 29:
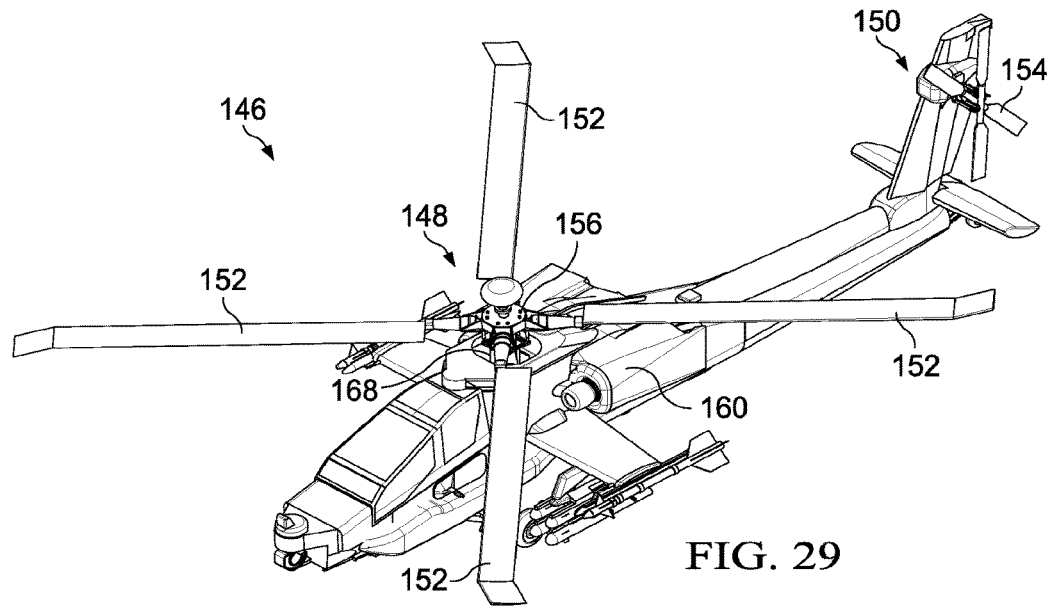
FIG. 29 is an illustration of a perspective view of a helicopter.
Figure 30:
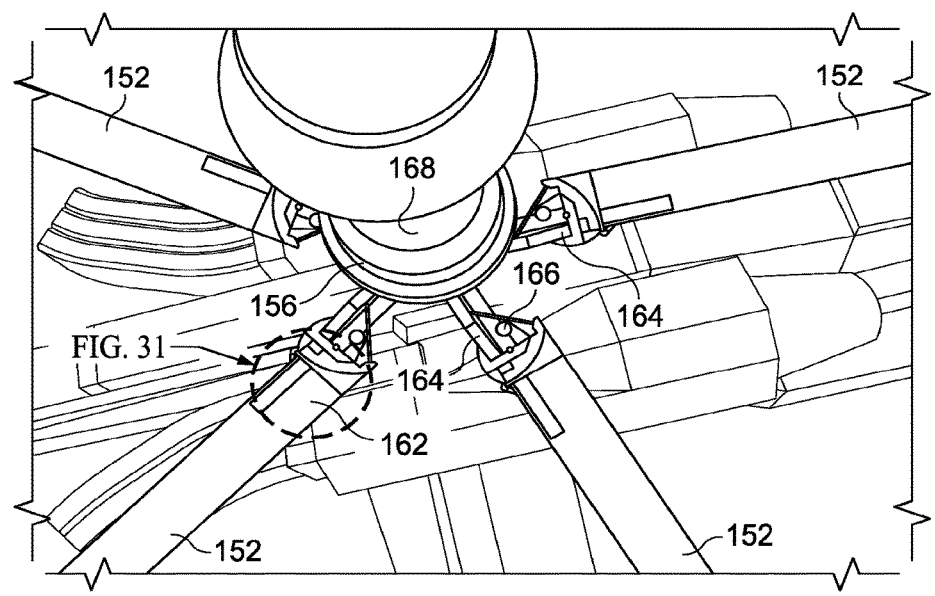
FIG. 30 is an illustration of a perspective view of a rotor assembly of the aircraft shown in FIG. 29.
Figure 31:
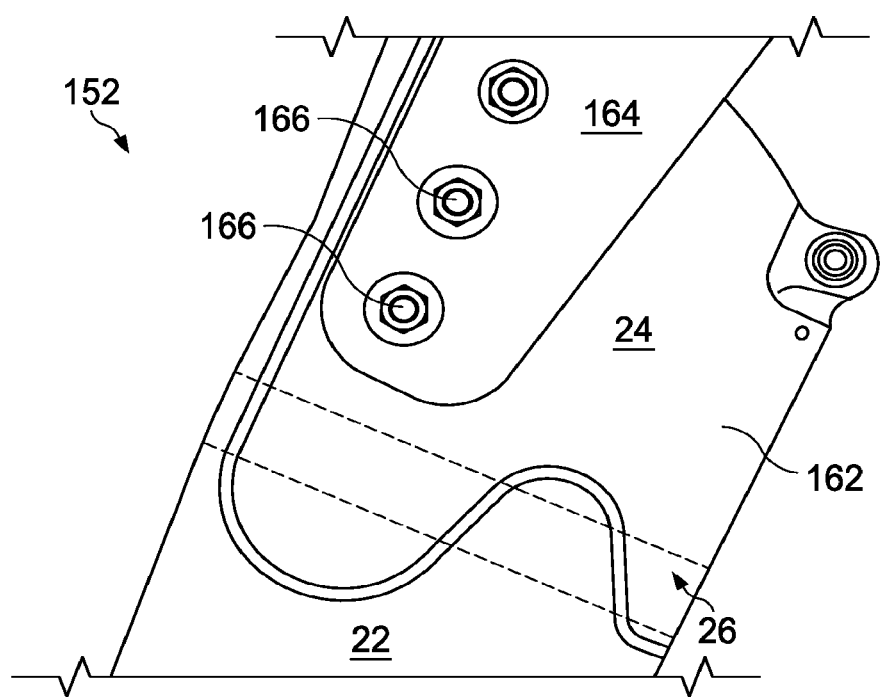
FIG. 31 is an illustration of the area designated as FIG. 31 in FIG. 30.

Referring now to FIG. 29, the composite-to-metal joint 26 may be employed to attach components on other types of aircraft, such as, for example and without limitation, a helicopter 146. The helicopter 146 includes a main rotor assembly 148 and a tail rotor assembly 150. The main rotor assembly 148 includes a plurality of main rotator blades 152, and the tail rotor assembly 150 comprises a plurality of tail rotor blades 154. Each of the main rotor blades 152 is mounted on a rotor hub 156 secured to a rotating mast 168 that is powered by one or more engines 160. Referring particularly to FIGS. 30 and 31, each of the main rotor blades 152 is attached to the hub 156 by means of blade grips 164. The root 162 of each blade 152 is held on the blade grips 164 by retention bolts 166. Each of the blades 152 includes an elongate outer composite resin portion 22 which may be a carbon fiber epoxy composite, and a metal portion 24 that is attached to the blade grips 164 by the retention bolts 166. Metal portion 24 of the blade 152 is connected to the outer composite resin portion by a composite-to-metal joint 26 of the type previously described. The tail rotor blades 154 shown in FIG. 29 may similarly be attached to the tail rotor assembly 150 by a composite-to-metal joint 26.

Figure 32:
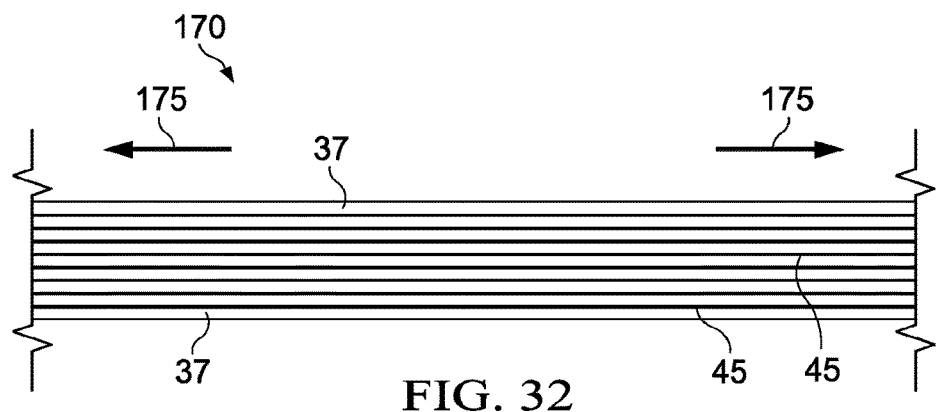
FIG. 32 is an illustration of a cross sectional view of a bonded metal laminate.

Referring to FIG. 32, a metal laminate 170 comprises a plurality of generally flexible metal sheets or plies 37 which are bonded together by layers 45 of a suitable adhesive to form a structure that may exhibit performance properties that are superior to a comparable monolithic metal structure. The layers 45 of adhesive may comprise a conventional film-type structural adhesive. The metal plies 37 may be formed of the same metal or may be formed of differing metals, depending on the particular application. When the metal laminate 170 is placed in tension 175, the tension load is individually directed to each of the metal laminate plies 37, thereby distributing the tension load generally evenly throughout the metal structure 170. Thus, in the event of an irregularity or inconsistency in one of the metal plies 37 that may reduce the load carrying ability of the ply 37, the reduction is limited to that particular ply and the applied tension load is redistributed to the remaining metal plies 37 which provide strain relief. In other words, sensitive areas (i.e. plies 37) of the metal laminate 170 that are under load locally strain and transfer the load to adjacent metal plies 37, resulting in a form of a progressive loading of the metal laminate 170.

Figure 33:
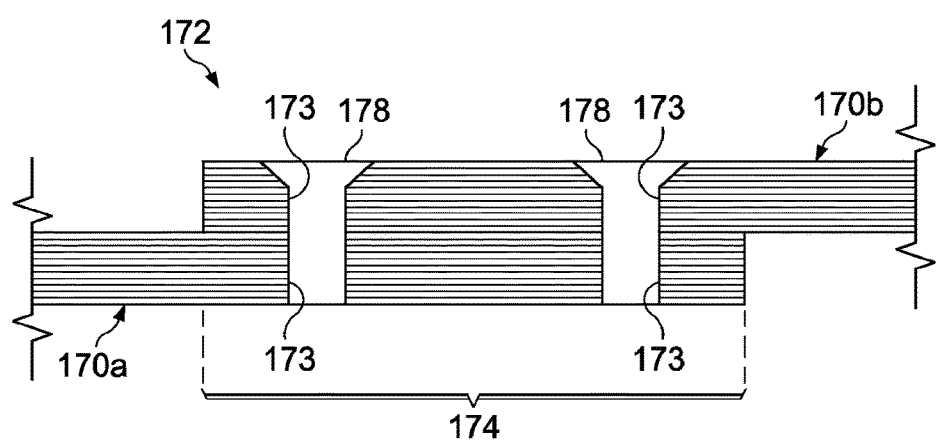
FIG. 33 is an illustration of a cross sectional view of two bonded metal laminates joined together by fasteners.

The metal laminate 170 shown in FIG. 32 may be employed to form composite-to-metal joints 26 of the type previously described, but may have other applications as well. For example, referring to FIG. 33, two generally flat metal laminates 170*a*, 170*b* may be attached to each other by a lap joint 172 and fasteners 178 that pass through through-holes 173 the metal laminates 170*a*, 170*b*. The lap joint 172 employing may exhibit characteristics that are superior to joints employing monolithic structures. The metal laminates 170*a*, 170*b* may form the edges of a composite structure to which the metal laminates 170*a*, 170*b* are joined by composite-to-metal joints 26 of the type previously described.

Figure 34:
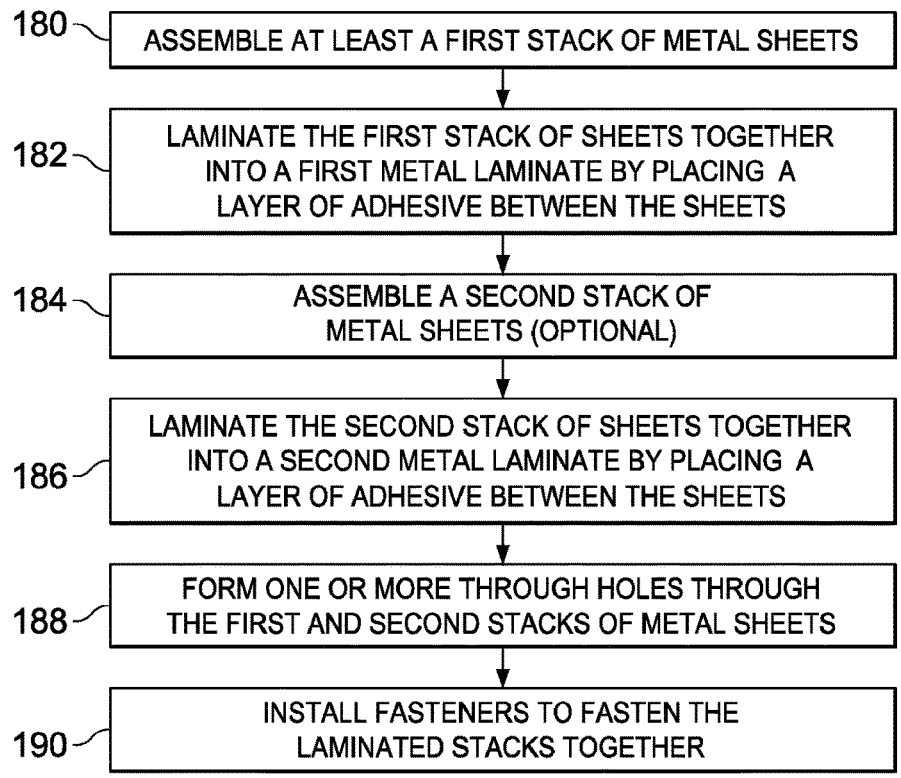
FIG. 34 is a flow diagram showing a method fabricating the bonded metal laminate shown in FIG. 32.

Referring to FIG. 34, a method of fabricating a structure begins at 180, with assembling at least a first stack 36 of metal sheets or plies 37. The metal sheets or plies 37 are then laminated together at 182 by placing a layer of structural adhesive between the sheets or plies 37 which bonds and laminates the sheets or plies 37 together into a first metal laminate 170*a*. Then, optionally at 184, a second stack of metal sheets or plies 37 is assembled and laminated together at 186 into a second metal laminate 170*b*. At 188, one or more through-holes 173 are formed in the first and second laminates 170*a*, 170*b*. At 190, fasteners are installed in the though-holes 173 to fasten the metal laminates 170*a*, 170*b* together.

Figure 35:
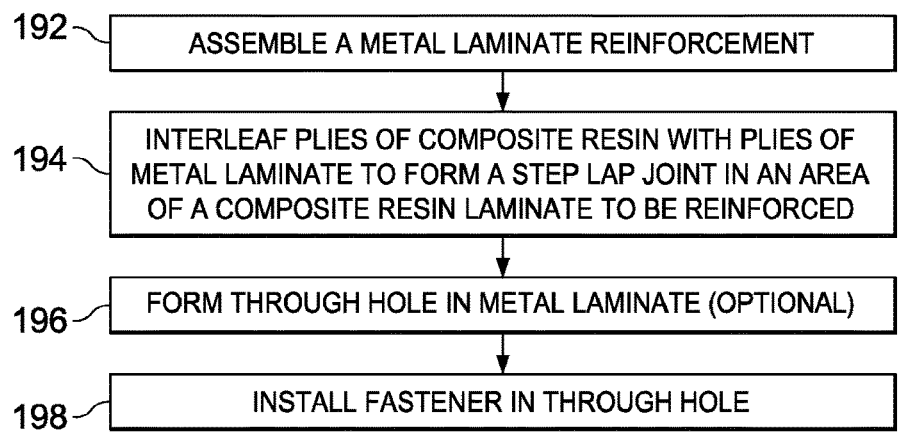
FIG. 35 is an illustration of a flow diagram of a method of reinforcing a composite laminate containing a fastener.

Referring to FIG. 35, selected areas of a fiber reinforced composite resin laminate structure may be reinforced by a method that begins at step 192 with assembling a metal laminate reinforcement 76. At step 194, composite resin plies 35 of the composite resin laminate structure are interleafed with the metal laminate plies 37 of the metal laminate reinforcement 76 to form a composite-to-metal step lap joint 26 in the area of the composite resin laminate structure to be reinforced. As previously discussed, the metal laminate reinforcement 76 may be used to reinforce an edge of the composite resin laminate structure, or to provide a metal reinforced area around a fastener 78. Thus, optionally, at step 196, a through-hole 85 may be formed in the metal reinforcement 76, and at 198, a fastener 78 may be installed in the through-hole 85.

Figure 36:
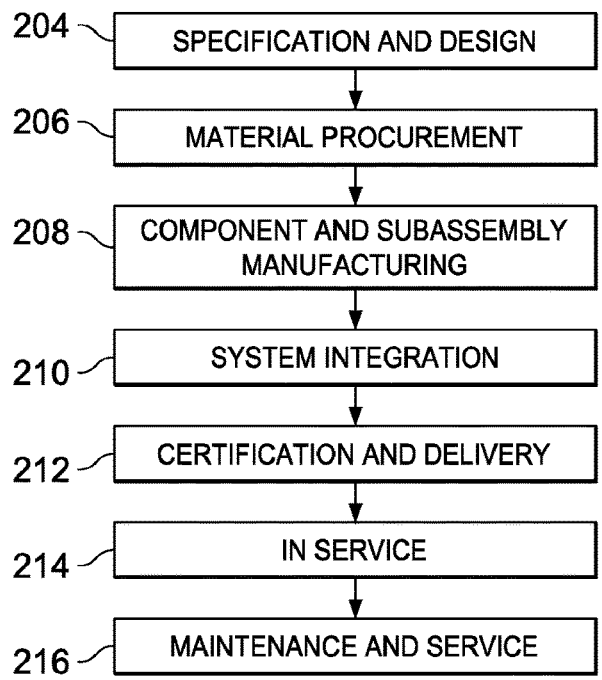
FIG. 36 is an illustration of a flow diagram of aircraft production and service methodology.
Figure 37:
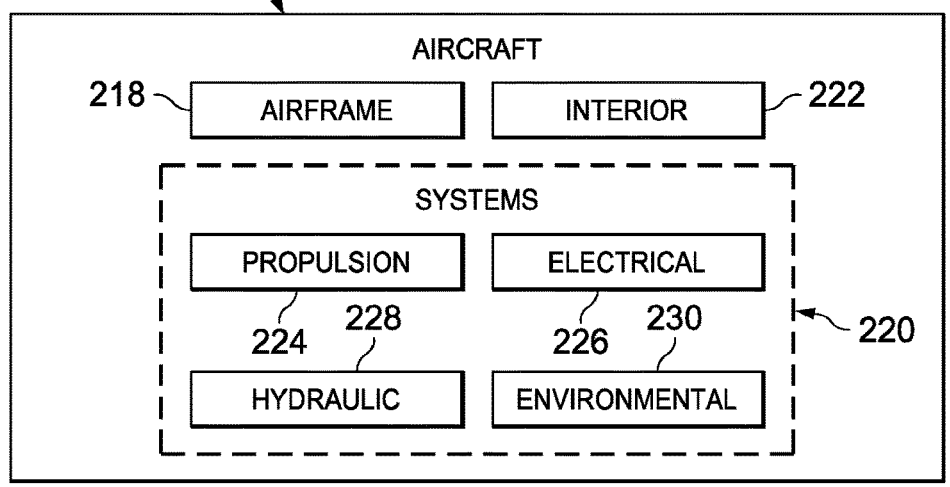
FIG. 37 is an illustration of a block diagram of an aircraft.

Embodiments of the disclosure may find use in a variety of potential applications, particularly in the transportation industry, including for example, aerospace, marine and automotive applications. Thus, referring now to FIGS. 36 and 37, embodiments of the disclosure may be used in the context of an aircraft manufacturing and service method 200 as shown in FIG. 36 and an aircraft 202 as shown in FIG. 37. Aircraft applications of the disclosed embodiments may include, for example, a wide variety of structural composite parts and components, especially those requiring local reinforcement and/or the use of fasteners during the assembly process. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 37, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. The disclosed method may be employed to fabricate parts, structures and components used in the airframe 218 or in the interior 222. Although an aerospace example is shown, the principles of the disclosure may be applied to other industries, such as the marine and automotive industries.

Systems and methods embodied herein may be employed during any one or more of the stages of the production and service method 200. For example, parts, structures and components corresponding to production process 208 may be fabricated or manufactured in a manner similar to parts, structures and components produced while the aircraft 200 is in service. Also, one or more apparatus embodiments, method embodiments, or a combination thereof may be utilized during the production stages 208 and 210, for example, by substantially expediting assembly of or reducing the cost of an aircraft 200. Similarly, one or more of apparatus embodiments, method embodiments, or a combination thereof may be utilized while the aircraft 202 is in service, for example and without limitation, to maintenance and service 216.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite structure, comprising:
    forming a first stack of metal sheets comprising adhering individual sheets, comprising metal, to each other;
    laminating the first stack of metal sheets together by placing a layer of adhesive between each of the metal sheets; and
    joining the first stack of metal sheets to a resin laminate along an edge of the resin laminate, the resin laminate comprising multiple plies and a fiber reinforcement, and forming a composite-to-metal joint comprising overlapping steps between the resin laminate and the first stack of metal sheets, a length of an overlap of the overlapping steps determined by a load requirement of an integrated attachment fitting, such that the composite-to-metal joint comprises a finger joint and a first metal ply in the first stack of metal sheets comprises a different metal from a second metal ply in the first stack of metal sheets.

2. The method of claim 1, further comprising:
    assembling a second stack of metal sheets;
    laminating the second stack of metal sheets together by placing a layer of adhesive between each of the metal sheets; and
    fastening the first and the second stacks of the metal sheets together by passing fasteners through the first and the second stacks of the metal sheets.

3. A method of reinforcing an area of a composite laminate containing a fastener passing through a thickness of the composite laminate, comprising:
    integrating a metal laminate, comprising metal sheets laminated directly to each other via an adhesive ply, into the area of the composite laminate to be reinforced, the metal laminate comprising multiple plies;
    bonding each metal sheet within the metal laminate to an adjoining metal sheet, the metal laminate comprising a shape being substantially circular and each metal sheet within the metal laminate comprising a radius differing from a radius of an adjacent metal sheet within the metal laminate; and
    forming a through hole in the metal laminate adapted to receive the fastener therein.

4. The method of claim 3, further comprising integrating the metal laminate into the composite laminate via interleafing plies of the metal laminate with plies of the composite laminate to form a finger joint between the metal laminate and the composite laminate.

5. The method of claim 3, further comprising:
    forming a composite-to-metal joint between the metal laminate and the composite laminate, the composite-to-metal joint comprising a variation in the radius relative to the radius of the adjacent metal sheet in the metal sheets bonded together being determined by a specified thermal expansion interface coefficient, such that multiple layers of the composite laminate circumferentially abut a perimeter edge of each metal sheet respectively.

6. The method of claim 5, further comprising interleafing edges of the metal sheets of the metal laminate with edges of the multiple layers of the composite laminate.

7. The method of claim 6, further comprising determining the variation in a radius of one metal sheet relative to the radius of the adjacent metal sheet in the metal sheets bonded together based upon a load requirement for the fastener.

8. A method of reinforcing an edge of a resin laminate, comprising:
    joining a metal laminate to the resin laminate along the edge of the resin laminate, the resin laminate comprising multiple plies and a fiber reinforcement, and forming a composite-to-metal joint comprising overlapping steps between the resin laminate and the metal laminate, a length of an overlap of the overlapping steps determined by a load requirement of an integrated attachment fitting, such that the composite-to-metal joint comprises a finger joint and a first metal ply in the metal laminate comprises a different metal from a second metal ply in the metal laminate.

9. The method of claim 8, wherein joining the metal laminate to the resin laminate is performed by interleafing edges of the plies of the metal laminate and the resin laminate.

10. The method of claim 9, wherein the interleafing is performed in a manner to form a finger joint between the metal laminate and the resin laminate.

11. A method of forming an attachment fitting for a structure, the method comprising:
    joining a composite resin portion to a metal portion such that:
        the composite resin portion comprises layers of composite laminate; and
        the metal portion comprises a stack of metal plies, each metal ply in the stack of metal plies being:
            substantially chemically non-reactive with any layer in the layers of composite laminate abutting the each metal ply; and
            connected to an adjoining metal ply via an adhesive layer;
    forming a composite-to-metal joint between the composite resin portion and the metal portion such that each layer of composite laminate comprises a thickness that is less than a thickness of any metal ply whose end abuts a termination of the each layer of composite laminate, such that terminations of some of the layers of composite laminate in the composite resin portion are recessed from a vertical alignment of terminations of layers of composite laminate in the composite resin portion that are not recessed, and the termination of each of the some of the layers of composite laminate aligns vertically with a termination of each other of the some of the layers of composite laminate and the termination of each of the some of the layers of composite laminate abuts a respective end of an individual metal ply in the stack of metal plies to form a vertical lap finger joint, and each metal ply abuts multiple layers of composite laminate; and forming a second composite-to-metal joint comprising the metal portion and a second composite resin portion.

12. The method of claim 11, wherein a reduction in a load carrying capability of any one ply in the stack of metal plies results in a transfer of the load across all other plies in the stack of metal plies, an end of each metal ply being vertically aligned with an end of a non-adjacent metal ply.

13. The method of claim 11, wherein the composite resin portion comprises a plurality of fiber reinforced resin plies, and each metal ply abuts at least three fiber reinforced resin plies.

14. The method of claim 11, wherein the composite-to-metal joint comprises overlapping steps between the composite resin portion and the stack of metal plies, a length of an overlap of the overlapping steps determined by a load requirement of an integrated attachment fitting.

15. The method of claim 14, further comprising:
the composite-to-metal joint comprising a finger joint; and
a first metal ply in the stack of metal plies comprising a different metal from a second metal ply in the stack of metal plies.

16. The method of claim 11, wherein the structure is an aircraft wing and the metal portion is a metal laminate having a plurality of through holes therein adapted to receive fasteners for attaching the aircraft wing to a center wing box on an aircraft fuselage.

17. The method of claim 11, wherein the structure is an aircraft wing and the metal portion is a metal laminate having a plurality of through holes therein adapted to receive fasteners.

* * * * *